United States Patent [19]

Rafalovich et al.

[11] Patent Number: 5,497,629
[45] Date of Patent: Mar. 12, 1996

[54] HEATING AND COOLING SYSTEMS INCORPORATING THERMAL STORAGE

[75] Inventors: Alexander P. Rafalovich; Joseph A. Gustin; William J. Longardner; Gilbert P. Keller; Thomas C. Schmidter, all of Indianapolis, Ind.

[73] Assignee: Store Heat and Produce Energy, Inc., Indianapolis, Ind.

[21] Appl. No.: 265,451

[22] Filed: Jun. 24, 1994

Related U.S. Application Data

[63] Continuation-in-part of Ser. No. 36,041, Mar. 23, 1993, Pat. No. 5,355,688.

[51] Int. Cl.$^6$ ............................ F25D 17/02; F25B 41/00
[52] U.S. Cl. .................... 62/98; 62/199; 62/332
[58] Field of Search ............................. 62/117, 199, 332, 62/98

[56] References Cited

U.S. PATENT DOCUMENTS

| | | | |
|---|---|---|---|
| 2,241,070 | 5/1941 | McLenegan | 165/18 X |
| 2,846,421 | 8/1958 | Pollock | 260/82.3 |
| 3,991,936 | 11/1976 | Switzgable | 62/383 X |
| 4,030,312 | 6/1977 | Wallin et al. | 62/238.6 X |
| 4,100,092 | 7/1978 | Spauschus et al. | 62/324 X |
| 4,117,882 | 11/1978 | Shurcliff | 165/11.1 |
| 4,127,161 | 11/1978 | Clyne et al. | 126/400 X |
| 4,256,475 | 3/1981 | Schafer | 165/29 |
| 4,270,518 | 6/1981 | Bourne | 62/238.77 X |
| 4,283,925 | 8/1981 | Wildfeuer | 62/332 X |
| 4,291,750 | 9/1991 | Clyne et al. | 165/35 X |
| 4,403,731 | 9/1983 | Katz | 237/2 B |
| 4,462,461 | 7/1984 | Grant | 165/26 |
| 4,608,836 | 9/1986 | MacCracken et al. | 62/325 |
| 4,609,036 | 9/1986 | Schrader | 165/10 |
| 4,637,219 | 1/1987 | Grose . | |
| 4,645,908 | 2/1987 | Jones | 62/160 X |
| 4,685,307 | 8/1987 | Jones | 62/160 |
| 4,693,089 | 9/1987 | Bourne et al. | 62/79 |
| 4,739,624 | 4/1988 | Meckler | 62/160 |
| 4,742,693 | 5/1988 | Reid, Jr. et al. | 62/476 |
| 4,753,080 | 6/1988 | Jones et al. | 62/59 |
| 4,807,696 | 2/1989 | Colvin et al. | 165/10 |
| 4,809,516 | 3/1989 | Jones | 62/160 |
| 4,840,037 | 6/1989 | Yamada et al. | 62/199 |
| 4,893,476 | 1/1990 | Bos et al. | 62/79 |
| 4,909,041 | 3/1990 | Jones | 62/99 |
| 4,918,936 | 4/1990 | Sakamoto | 62/117 |
| 4,940,079 | 7/1990 | Best et al. | 165/2 |
| 5,036,904 | 8/1991 | Kanada et al. | 62/430 |

FOREIGN PATENT DOCUMENTS

| | | | |
|---|---|---|---|
| 188987 | 11/1982 | Japan . | |
| 060187 | 4/1984 | Japan . | |
| 009560 | 3/1986 | Japan . | |
| 243284 | 10/1986 | Japan . | |
| 4187926 | 7/1992 | Japan | 62/199 |

OTHER PUBLICATIONS

Electro Hydronic Systems, *Water Source Heat Pump Design Manual*, (Apr. 1987) S.E.D. 13002.

Reardon, J. Gregory, *Heating with Ice Storage— A Case Study*.

Adams, Laura S., *Lennox Cool Thermal Energy Storage (CTES) A Direct Expansion Storage Module For Split System Air Conditioners*.

Shive, Patrick L., *An Electric Heat Pump With An Off-Peak Electric Hydronic Based Backup System*.

(List continued on next page.)

*Primary Examiner*—William E. Wayner
*Attorney, Agent, or Firm*—Woodard, Emhardt, Naughton, Moriarty & McNett

[57] ABSTRACT

A vapor compression refrigeration system for providing cold storing which; during a conventional cycle provides cooling to an indoor heat exchanger in the conventional fashion, during a cooling charging cycle refrigeration effect is stored in a heat storage vessel by refrigerant evaporation with the indoor heat exchanger being by-passed and during a discharging cooling cycle refrigerant passes through the heat storage vessel without evaporation and evaporates in the indoor heat exchanger to provide space cooling.

11 Claims, 14 Drawing Sheets

OTHER PUBLICATIONS

York Applied Systems, *IceBalls™ Thermal Storage System.*

Uhr, Jr., C. William, *A "Smart" Triple Function Storage System.*

Best, Gerald, *Phenix THP/3 Systems: Projected Utility Value.*

Courtright, Henry A. et al., *Off–Peak Space Heating Systems.*

Christopia Energy Systems, *STL Thermal Energy Storage Manual.*

Fath, Hassan E. S., *Heat Exchanger Performance For Latent Heat Thermal Energy Storage System.*

Gultekin, Nurbay et al., *Heat Storage Chemical Materials Which Can Be Used For Domesti Heating By Heat Pumps.*

Sozen, Zeki Z. et al, *Thermal Energy Storage By Agitated Capsules Of Phase Change.*

Havelsky, V. et al., *Heat Pump Design With Thermal Storage, Heat Recovery Systems and CHP*, vol. 9, No. 5, pp. 447–450, 1989.

Powell Energy Products, Inc. Brochure, *Introducing Ice. Storage. Air–Conditioning To the Utility.*

HEATING AND COOLING SYSTEMS INCORPORATING THERMAL STORAGE

CROSS-REFERENCE TO RELATED APPLICATION

The present invention is a continuation-in-part of U.S. patent application Ser. No. 08/036,041, filed Mar. 23, 1993, now U.S. Pat. No. 5,355,688.

BACKGROUND AND SUMMARY OF THE INVENTION

The present invention relates to a heating and cooling system incorporating a thermal storage device. More particularly, the present invention relates to various refrigerant-based heating and cooling systems incorporating direct expansion thermal storage devices, some of which are suited to contain both encapsulated and unencapsulated phase change materials.

Air source heat pumps extract heat from outdoor air and deliver it to the air distribution system of an indoor space to be heated. In effect, air source heat pumps "pump" heat into a space just as typical air conditioners "pump" heat out of a space.

It is widely recognized, however, that when ambient temperatures fall below a certain limiting level, heat pump efficiency decreases dramatically. That is, a balance point temperature may be defined for heat pump systems at which the heat pump capacity equals the heat loss from the home. Supplemental heating will be required to maintain temperatures in the heated space when the ambient temperature falls below the balance point.

Unfortunately, the balance point for most heat pump systems ranges from about 20° to about 32° F. (about −7° to about 0° C.). Thus, heat pumps operating in typical North American wintertime conditions normally must be provided with supplemental heating.

In addition, heat pumps are often called upon to operate under rapidly changing ambient conditions which may give rise to a mismatch between heat pump heat production capability and heat demand. For example, in operation during a typical winter day, average ambient temperatures may well remain close to the system balance point temperature during the daytime, but may rapidly fall well below the system balance point temperature at night. Thus, the system is likely to operate with excess heating capacity during the daytime and inadequate heating capacity at nighttime. Supplemental heating will likely be required at nighttime.

An analogous phenomenon occurs when the heat pump system is operating in a cooling mode to extract heat from the conditioned space. The efficiency of the heat pump decreases as ambient temperature increases. In typical summertime operation, the heat pump may operate with adequate cooling capacity during daytime hours but will have excess cooling capacity during nighttime hours.

The requirement for supplemental heating reduces any economic benefit that a heat pump system might otherwise provide over conventional heating systems. Moreover, such a system will most probably be operating at highest capacity (and lowest efficiency) during on-peak billing hours (for example, during the daytime generally).

Some researchers have attempted to overcome these problems by incorporating a thermal storage device into the heat pump system. See, for example, U.S. Pat. Nos. 4,100,092; 4,256,475; 4,693,089; 4,739,624; and 4,893,476. Such devices typically use a phase change material to enable thermal energy storage in the form of latent heat as the material changes phase, typically between solid and liquid. The thermal energy storage device would, for example, store the excess heating capacity during daytime winter operation for release during nighttime operation when supplemental heating would otherwise be needed. Analogously, the thermal energy device would store "coolness" during nighttime summer operation and would release the "coolness" during daytime operation, reducing the system power requirements.

Typically, heat pump and air conditioning systems incorporating thermal storage devices have sought to achieve energy savings by reducing the load on the system compressor, or by shifting electrical use patterns by "decoupling" compressor operation from building loads, as in the case of so-called "refrigeration coupled thermal energy storage" systems. Some systems, in fact, are designed to interrupt operation of the compressor altogether at certain times, thereby reducing the overall compressor energy consumption. However, such systems require a supplemental fan to achieve heat transfer directly from the thermal storage medium. Other such systems rely upon existing fans but require substantial additional ductwork to deliver air flow from the fans to the thermal storage device.

In addition, attempts have been made to provide a thermal storage device to provide heat transfer between a working fluid and phase change materials contained in the thermal storage device. Researchers have attempted to encapsulate phase change materials in an effort to maximize surface area available for heat transfer contact with the working fluid. In addition, researchers have developed a variety of phase change compositions suitable for use over various temperature ranges, increasing system flexibility. Examples of designs of thermal storage devices are numerous in the art. See, for example, U.S. Pat. Nos. 3,960,207; 4,127,161; 4,219,072; 4,256,475; 4,283,925; 4,332,290; 4,609,036; 4,709,750; 4,753,080; 4,807,696; 4,924,935; and 5,000,252.

Further, researchers have proposed a variety of control strategies for enhancing operating efficiency of heat pump systems incorporating thermal storage devices. Such control strategies, for example, may involve continuous computation of thermal storage target conditions based upon time, ambient conditions, and/or conditions in the thermal storage device. See, for example, U.S. Pat. Nos. 4,645,908; 4,685,307; and 4,940,079.

These attempts, while numerous, have not heretofore resulted in the widespread adoption of thermal storage devices for use in connection with heat pump systems. A need exists for heat pump systems which can be readily retrofit in existing heat pump systems and which provide a variety of configurations for controlling flow of the working fluid (for example, refrigerant) in a circuit designed to maximize system efficiency and flexibility.

Furthermore, a need exists to provide a conditioning system which can be operated in both a conventional cycle and a thermal storage charging and discharging cycle to provide greater flexibility in selection of compressors. In air conditioning particularly, there is a need to provide systems which can rapidly cool down a space during peak demand periods, but which avoids reliance an excess cooling capacity (i.e., cooling capacity which goes unused during off-peak demand periods).

According to the present invention, a heat pump and air conditioning system is provided. The system is operable in at least one of a heating mode and a cooling mode, both modes including a thermal charging cycle and a thermal discharging cycle. The system comprises a refrigerant circuit including a compressor and, in serial connection, a first heat exchanger, an expansion device, and a second heat exchanger. The system further comprises a thermal storage device, first means for connecting the thermal storage device in parallel with the first heat exchanger, a first pair of three-way valves positioned to block flow to and from the first connecting means, second means for connecting the thermal storage device in parallel with the second heat exchanger, and a second pair of three-way valves positioned to block flow to and from the second connecting means. The system further comprises means for controlling the first and second pairs of three-way valves so that during operation in the heating mode, charging cycle, refrigerant from the refrigerant circuit flows in the first connecting means through the thermal storage device, and during operation in the cooling mode, discharging cycle, refrigerant from the refrigerant circuit flows in the second connecting means through the thermal storage device.

Further in accordance with the present invention, a heat pump and air conditioning system is provided. The system is operable in at least one of a heating and a cooling mode, both modes including thermal charging and discharging cycles. The system comprises a refrigerant circuit, a phase change heat exchanger or thermal storage device positioned in the refrigerant circuit, a pair of bypass conduits, and a controller for controlling flow through the bypass conduits. The refrigerant circuit includes a compressor, and, in serial connection, a first heat exchanger, a first expansion device, a second expansion device, and a second heat exchanger. The thermal storage device is positioned in the refrigerant circuit between the first and second expansion devices. The first bypass conduit bypasses the first expansion device, and includes a first controlled valve, while the second bypass conduit bypasses the second expansion device and includes a second controlled valve. The means for controlling operation of the first and second controlled valves operates so that during thermal charging cycle, refrigerant flowing in the refrigerant circuit bypasses the first expansion device and during the thermal discharging cycle, refrigerant bypasses the second expansion device.

In accordance with another aspect of the invention, the first bypass line further bypasses the first heat exchanger and the second bypass line further bypasses the second heat exchanger.

According to yet a further aspect of the invention, a heat pump and air conditioning system operable in at least one of a heating and a cooling mode comprises a refrigerant circuit including a compressor, and, in serial connection, a first heat exchanger, a four-way valve, and a second heat exchanger. The system further includes a thermal storage circuit including a thermal storage device, an expansion device, a first conduit extending between the four-way valve and the expansion device, and a second conduit extending between the four-way valve and the thermal storage device. The system further includes means for controlling operation of the four-way valve so that during operation in the heating mode, charging cycle, and the cooling mode, discharging cycle, refrigerant flowing in the refrigerant circuit flows through the thermal storage device prior to passing through the expansion device, and during operation in the heating mode, discharging cycle and the cooling mode, charging cycle, refrigerant flowing in the refrigerant circuit flows through the expansion device before flowing through the thermal storage device.

In accordance with yet another aspect of the invention, the system further comprises a first bypass conduit extending between the refrigerant circuit and the thermal storage circuit to bypass the first heat exchanger and a second bypass conduit extending between the refrigerant circuit and the thermal storage circuit to bypass the second heat exchanger, and wherein the control means includes first means for directing flow between the refrigerant circuit and the first bypass conduit and second means for directing flow between the refrigerant circuit and the second bypass conduit.

Further in accordance with the present invention, a method is provided for conditioning a space using a heat pump and air conditioning system. The system includes a refrigerant circuit and a thermal storage device and the refrigerant circuit includes a compressor, a four-way reversing valve, and, in serial connection, a first heat exchanger, an expansion device, and a second heat exchanger. The thermal storage device is connected in parallel with both the first and second heat exchangers. The method comprises splitting refrigerant flow from the compressor into a first and a second portion, simultaneously flowing the first portion through the first heat exchanger and the second portion through the thermal storage device.

Advantageously, systems of the present invention regulate refrigerant flow through the first and second heat exchangers to achieve energy savings. In the present systems, in contrast to those of the prior art, compressor operation is continuous. Systems of the present invention therefore avoid the need for supplemental fans directed through the phase change storage medium or supplemental ductwork from existing fans. Thus, systems of the present invention are easier to retrofit with existing heat pump systems currently operating in many settings without the benefit of thermal storage capability. Moreover, systems of the present invention may have higher efficiency in the heating mode as compared to conventional systems due to the reliance on thermal storage. Indeed, systems of the present invention require compressors having smaller compressor ratios than those commonly used in conventional systems, such that reliance on the present systems may allow a single stage compressor to be substituted for a two-stage compressor.

In addition, systems of the present invention rely upon a single refrigerant circuit (including a single compressor) for operation in both heating and cooling modes. Furthermore, no supplemental phase change material for cool storage is necessary with systems of the present invention.

In accordance with yet a further aspect of the invention, the phase change heat exchanger or thermal storage device includes a container defining an interior region configured to receive a first phase change material therein, the first phase change material having a first melt temperature. The thermal storage device further includes at least one refrigerant coil extending through the interior region to deliver a flow of refrigerant therethrough. The device also includes a plurality of phase change capsules disposed in the interior region, the phase change capsules each containing a second phase change material having a second melt temperature higher than the first melt temperature.

In accordance with yet a further aspect of the present invention, an apparatus is provided for heating or cooling a space. The apparatus comprises a main flow loop, a bypass line, a thermal storage device positioned in the bypass line, and a working fluid pump. The main flow loop includes a compressor, an outside heat exchanger, and inside heat exchanger, and a first valve located between the outside heat exchanger. The bypass line extends between the outlet of the outside heat exchanger and the outlet of the inside heat exchanger such that working fluid flowing in the bypass line bypasses the inside heat exchanger. The working fluid pump is positioned between the thermal storage device and the inlet side of the inside heat exchanger. The working fluid pump advantageously enables working fluid to circulate between the inside heat exchanger and the thermal storage device in the bypass line independently of the circulation of working fluid in the main flow loop.

In accordance with yet a further aspect of the present invention, an apparatus for heating or cooling a space comprises a main flow loop including a compressor, an outside heat exchanger, an inside heat exchanger, and a first valve selectively blocking flow between the outside and inside heat exchangers. The apparatus also includes a first bypass line, a thermal storage device positioned in the first bypass line, a second bypass line, and a second valve positioned in the second bypass line to selectively block flow therethrough. The first bypass line extends between the outlet of the outside heat exchanger and the inlet of the inside heat exchanger. The second bypass line extends between the inlet of the inside heat exchanger and the outlet of the inside heat exchanger and communicates with the first bypass line, advantageously allowing working fluid to flow from the outside heat exchanger through both the first and second bypass lines to the compressor, bypassing the inside heat exchanger.

In accordance with a further aspect of the present invention, a method is provided for discharging stored energy from a thermal storage device to heat or cool a space using a heating or cooling system. The system includes outside and inside heat exchangers, a compressor, and a working fluid pump. The method comprises the steps of initiating the flow of working fluid between the thermal storage device and the inside heat exchanger using the working fluid pump and condensing working fluid in the thermal storage device and evaporating working fluid in the inside heat exchanger, thereby cooling the space. The method further comprises the steps of initiating flow of working fluid between the outside heat exchanger and the inside heat exchanger using the compressor, while maintaining the flow of working fluid between the thermal storage device and the inside heat exchanger, and condensing the working fluid and the outside heat exchanger and evaporating working fluid in the inside heat exchanger, thereby further cooling the space.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying drawing figures in which.

DETAILED DESCRIPTION OF THE DRAWINGS

The present invention relates to various flow schemes for thermal storage-assisted heat pump and air conditioning systems and to thermal storage devices particularly adapted for use in such systems. The preferred flow schemes disclosed herein involve the use of refrigerant-based systems. Halocarbon compounds including, for example, freons such as R-22, are the preferred refrigerants for use in systems of the present invention, although other commercially available refrigerants such as ammonia can also be used.

The illustrated preferred embodiments of flow schemes in accordance with the present invention are heat pump systems which are designed to function in both a heating mode and a cooling mode. In the illustrated embodiments, refrigerant flow direction is changed (by use of a four-way reversing valve) to effect the change between heating mode and cooling mode. Those of ordinary skill in the art will appreciate that refrigerant flow direction changeover is simply one of several known means for changing the mode of operation of a typical heat pump system. Other reversal schemes not relying upon reversing valves, such as those reversal schemes set forth in ASHRAE Handbook 1984 Systems (Table 1, p. 10.2), hereby incorporated by reference, may also be used in accordance with the claimed invention without otherwise changing the flow schemes disclosed herein.

Alternatively, systems in accordance with the present invention may be designed as air conditioning systems only—for for example, systems operating only in the cooling mode. Such systems would omit any refrigerant flow reversing valve but would otherwise operate in accordance with the flow schemes as described herein for cooling mode operation.

Figure 1:
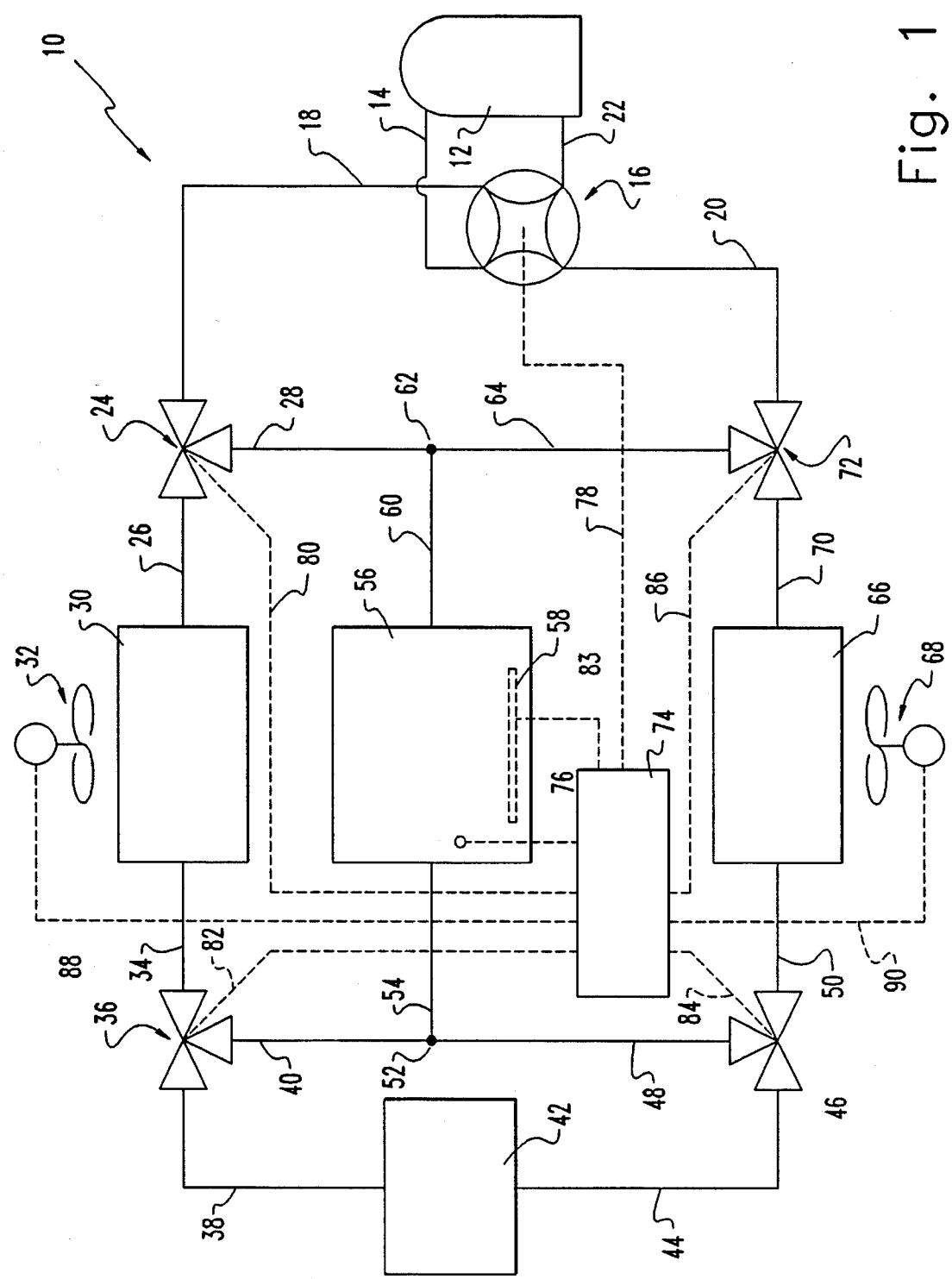
FIG. 1 is a diagrammatic view of one embodiment of a heat pump and air conditioning system in accordance with the present invention showing a phase change heat exchanger or thermal storage device in parallel connection with both a first and a second heat exchanger and a control apparatus for controlling refrigerant flow therebetween.

One preferred flow arrangement is illustrated in FIG. 1. As shown in FIG. 1, a heat pump system 10 includes a compressor 12 discharging a compressed refrigerant stream to a conduit 14. A four-way reversing valve 16 receives the compressed refrigerant stream from conduit 14 and communicates the compressed refrigerant stream to either a conduit 18 or a conduit 20 depending upon whether the system is operating in heating or cooling mode as described further below. Four-way reversing valve 16 is a commercially available valve typically pilot-operated by a solenoid valve or other control arrangement as illustrated. Refrigerant which has passed through system 10 is returned to reversing valve 16 and is communicated back to compressor 12 by way of a conduit 22.

Conduit 18 communicates refrigerant between four-way reversing valve 16 and a three-way valve 24. Three-way valve 24 controls flow between conduits 18, 26, and 28. Conduit 26 communicates refrigerant between three-way valve 24 and a first heat exchanger 30. First heat exchanger 30 is, for example, a standard refrigerant-to-air heat exchanger including a controlled fan 32, although a standard refrigerant-to-water heat exchanger using a water coil with a regulating valve may also be used.

A conduit 34 communicates refrigerant between first heat exchanger 30 and a three-way valve 36. Three-way valve 36 controls flow between conduits 34, 38, and 40. Conduit 38 communicates refrigerant between three-way valve 36 and an expansion device 42. Expansion device 42 may be any one of a number of commercially available expansion devices, such as a set of opposing flow thermostatic expansion valves, a capillary device, or other appropriate devices. Typical thermostatic expansion valves appropriate for use in systems of the present invention are described, for example, in ASHRAE Handbook 1988 Equipment pp. 19.3-.4.

A conduit 44 communicates the refrigerant stream between expansion device 42 and another three-way valve 46. Three-way valve 46 controls flow between conduits 44, 48, and 50. Conduit 48 joins conduit 40 at a three-way (T) junction 52 with another conduit 54.

Conduit 54 extends between junction 52 and a thermal storage device 56. Thermal storage device 56 is preferably of the structure shown in FIGS. 7–9, described further below. Optionally, a supplemental heater 58 (shown in dashed lines) is positioned in thermal storage device 56. Another conduit 60 extends between thermal storage device 56 and a junction 62. Junction 62 joins conduit 60, conduit 28, and a conduit 64.

Returning to conduit 50, that conduit extends between three-way valve 46 and a second heat exchanger 66. Second heat exchanger 66 is, for example, a standard refrigerant-to-air heat exchanger including a controlled fan 68, although a standard refrigerant-to-water heat exchanger using a water coil with a regulating valve may also be used.

Another conduit 70 extends between second heat exchanger 66 and a three-way valve 72. Three-way valve 72 controls flow between conduits 70, 20, and 64. Conduit 20 extends between three-way valve 72 and four-way reversing valve 16 to complete the refrigerant circuit.

Thus, in the embodiment of the present invention illustrated in FIG. 1, thermal storage device 56 is effectively connected in parallel with both first heat exchanger 30 and second heat exchanger 66. The flow path of refrigerant through this system is dependent upon control of the positions of four-way reversing valve 16 and three-way valves 24, 36, 46, and 72. Control is achieved through use of a controller 74. Controller 74 is wired to a thermocouple or other temperature sensing means disposed in thermal storage device 56 as indicated by dashed line 76. An additional temperature sensor may be used to sense the temperature of the space to be conditioned as well as the outdoor ambient temperature. Controller 74 may also be wired to an ice-level sensor. Based upon the sensed temperatures and other parameters which may be wired into the system logic or input by the user, the controller controls the positions of valve 16 (as indicated by dashed line 78), valves 24, 36, 46, and 72 (as indicated respectively by dashed lines 80, 82, 84, and 86), and controls whether fans 32 and 68 (as indicated by dashed lines 88, 90) are operating. Controller 74 also controls the supplemental heater 58 as indicated by dashed line 83. Controller 74 may, for example, include a microelectronic programmable thermostat of the type manufactured by White-Rogers or Honeywell operating in conjunction with an electronic time control and otherwise modified in a fashion within the capability of the ordinary artisan to perform the functions described herein. The time controller may be programmed to switch between heating and cooling modes and between charging and discharging cycles of those modes to take advantage of time-of-day energy use billing.

Figure 2:
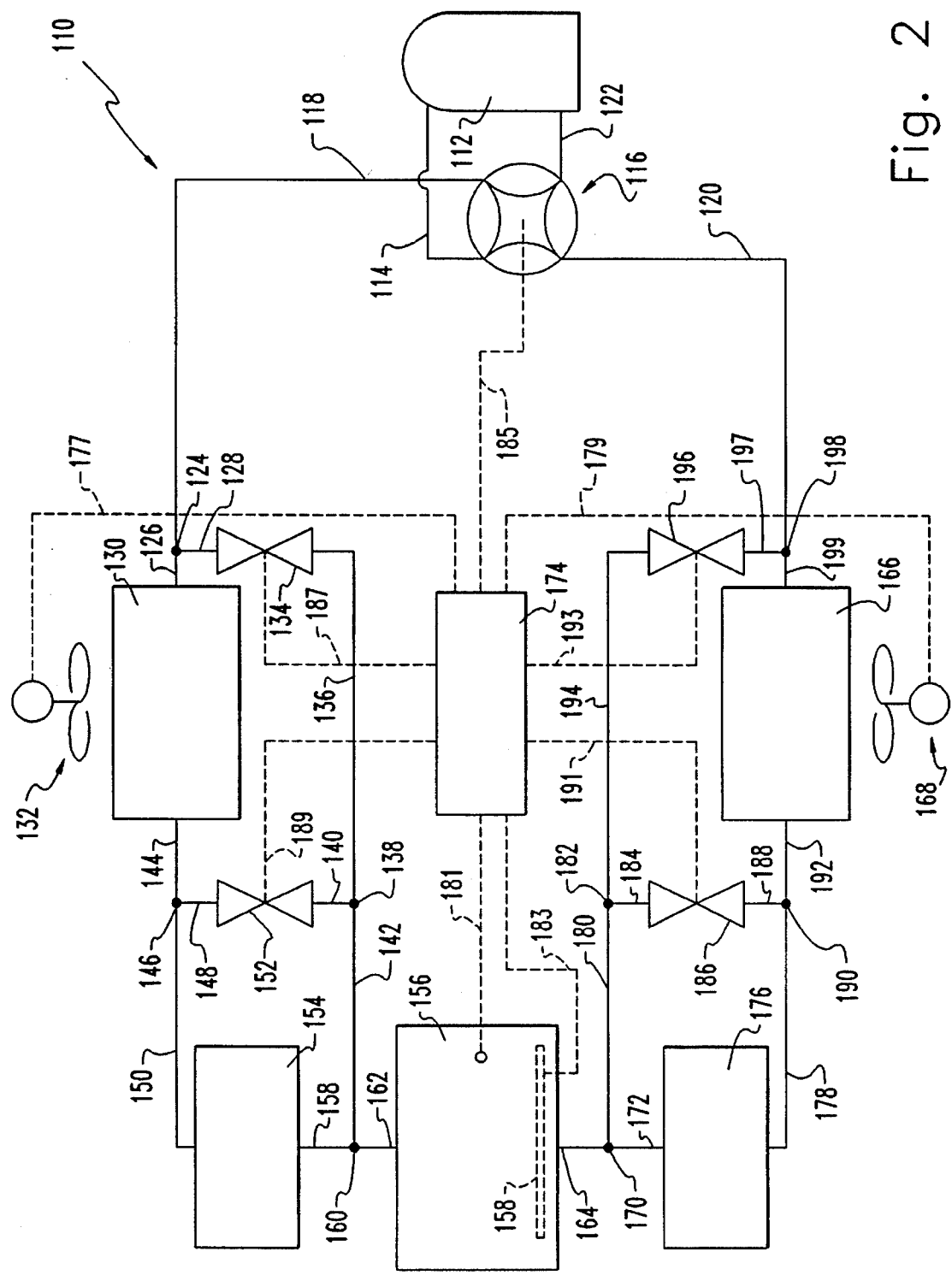
FIG. 2 is a diagrammatic view of another embodiment of a heat pump and air conditioning system in accordance with the present invention showing a thermal storage device in serial connection with both a first and a second heat exchanger, bypass conduits for bypassing both the first and the second heat exchangers along with a first and a second expansion device, and a control apparatus for controlling refrigerant flow therebetween.

In FIG. 2, another embodiment of a heat pump and air conditioning system in accordance with the present invention is illustrated. System 110 includes many components also used in system 10, as reflected by like reference numerals between the drawings. For example, compressor 112, four-way reversing valve 116, first heat exchanger 130 and its fan 132, second heat exchanger 166 and its fan 168, thermal storage device 156 and optional supplemental heater 158, and controller 174 are essentially unchanged from the embodiment of FIG. 1.

However, unlike the system 10 of FIG. 1, system 110 includes a thermal storage device connected in series with the condenser and the evaporator. In addition, system 110 includes a first bypass conduit bypassing both the first heat exchanger and an expansion device and a second bypass conduit bypassing the second heat exchanger and an expansion device.

In particular, a three-way (T) junction 124 connects conduit 118 with conduits 126 and 128. Conduit 126 extends between junction 124 and first heat exchanger 130. Conduit 128 extends between junction 124 and a valve 134. A conduit 136 extends between valve 134 and a junction 138. Junction 138 connects conduit 136 in fluid communication with conduits 140 and 142. As will be further described below, when valve 134 is open to flow between conduit 128 and conduit 136, refrigerant can bypass first heat exchanger 130 and first expansion device 154 by flowing through conduit 136 into conduit 142 to junction 160 and into conduit 162, from which it can pass into thermal storage device 156. Thus, conduits 128, 136, and 142 collectively provide a first bypass conduit for bypassing first heat exchanger 130 and first expansion device 154.

Similarly, refrigerant flowing in conduit 164 toward junction 170 can bypass second expansion device 176 and second heat exchanger 166. Conduits 180, 194, and 197 collectively provide a second bypass conduit operable when valve 196 is positioned to allow flow between conduits 194 and 197.

System 110 further includes a pair of conduits 148 and 140 extending between a junction 146 and junction 138 and including a valve 152 therein. Similarly, system 110 includes a pair of conduits 184, 188 extending between a junction 182 and a junction 190 and including a valve 186. Conduits 148 and 140 (along with conduit 142) allow bypass of expansion device 154 without bypass of first heat exchanger 130 when valve 134 is closed and valve 152 is open. Conduits 184 and 188 (along with conduit 192) allow bypass of expansion device 176 without bypass of second heat exchanger 166 when valve 196 is closed and valve 186 is open. Controller 174 operates to manipulate valves 116, 134, 152, 186, and 196 under appropriate conditions as indicated by dashed lines 185, 187, 189, 191, 193. Controller 174 also operates supplemental heater 158 as indicated by dashed line 183 and fans 132, 168 as indicated by dashed lines 177, 179.

Figure 3:
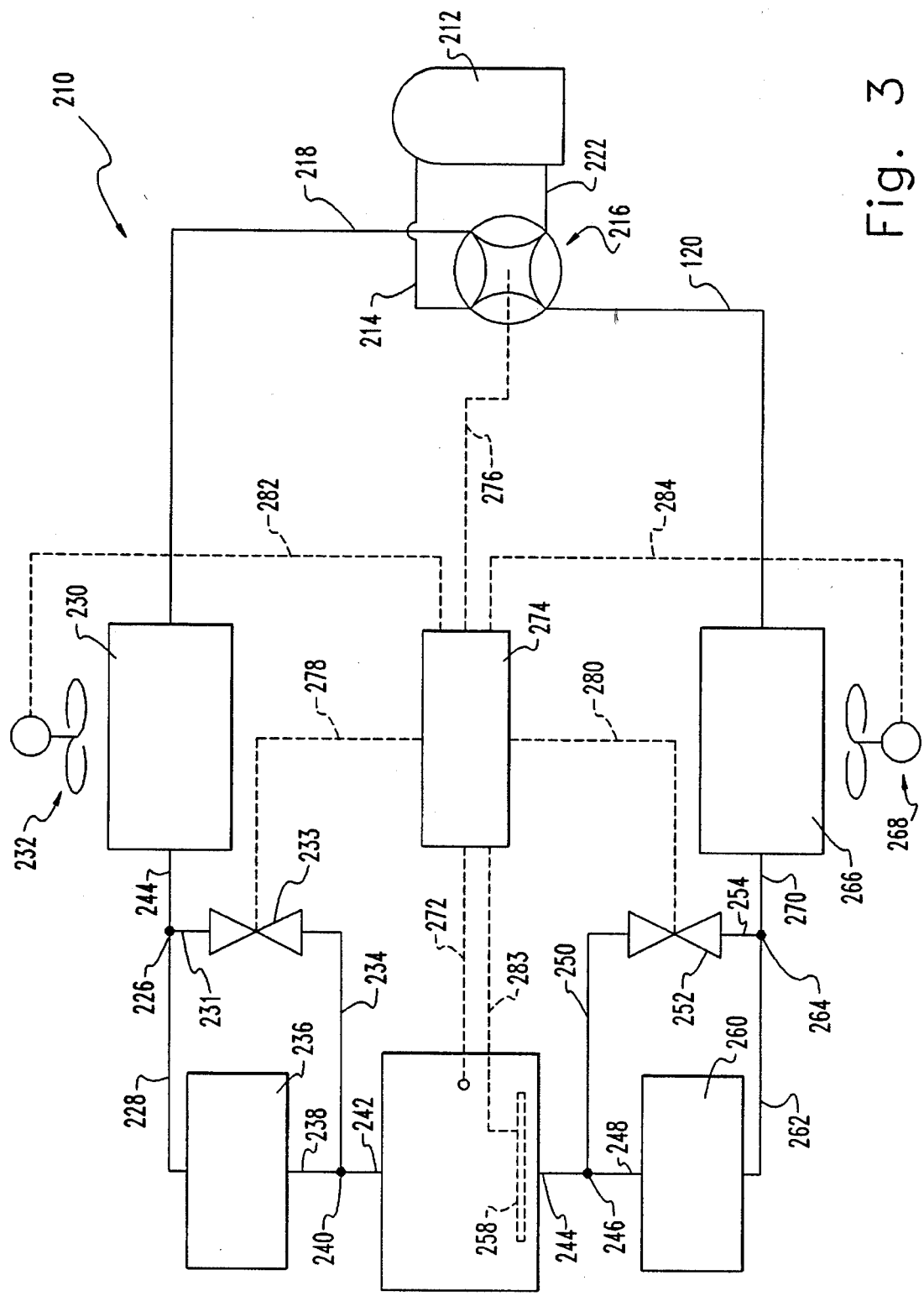
FIG. 3 is a diagrammatic view of yet another embodiment of a heat pump and air conditioning system in accordance with the present invention showing a thermal storage device in serial connection with both a first and a second heat exchanger and a first and a second expansion device, bypass conduits for bypassing both the first and the second expansion device, and a control apparatus for controlling refrigerant flow therebetween.

System 210 illustrated in FIG. 3 also provides first and second bypass conduits. Conduit 231 and conduit 234 cooperate to provide a first bypass conduit for bypassing expansion device 236 when valve 233 is open to allow flow. Likewise, conduits 250 and 254 cooperate to provide a second bypass conduit for bypassing expansion device 260 when valve 252 is open to allow flow. Here again, controller 274 manipulates valves 216, 233, 252 appropriately as indicated by dashed lines 276, 278, 280. In addition, controller 274 operates supplemental heater 258 as indicated by dashed line 283, and fans 232, 268 as indicated by dashed lines 282, 284.

Figure 4:
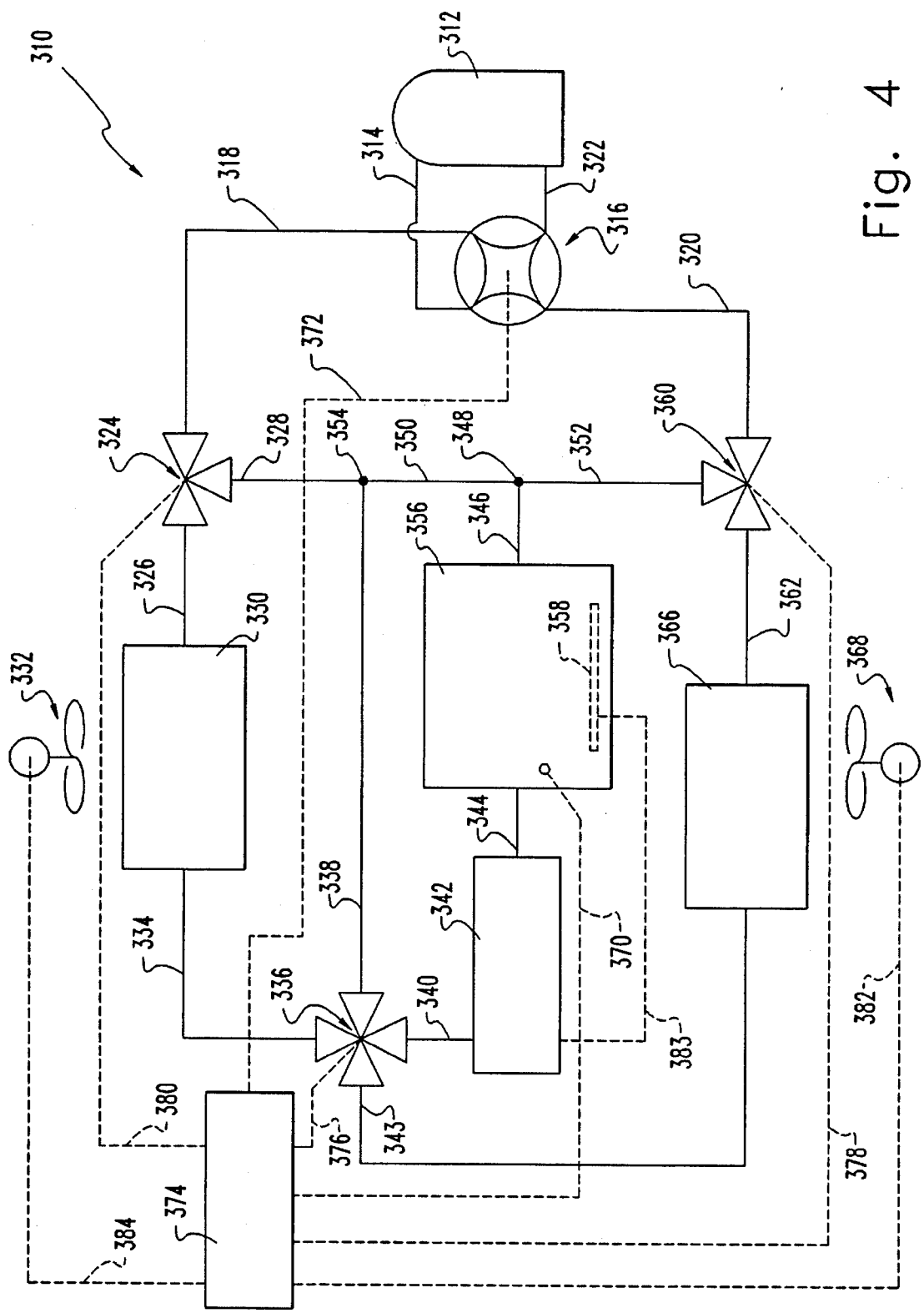
FIG. 4 is a diagrammatic view of yet another embodiment of a heat pump and air conditioning system in accordance with the present invention showing a thermal storage device connected to a four-way valve operating in conjunction with a pair of three-way valves to selectively bypass a first heat exchanger or a second heat exchanger, and a control apparatus for controlling operation of at least the valves to control flow of refrigerant.

System 310 illustrated in FIG. 4 provides a pair of three-way valves 324, 360 and a four-way valve 336. Four-way valve is not a reversing valve, but is preferably a valve similar to those used in hydraulic or wastewater applications.

Four-way valve 336 operates in conjunction with three-way valves 324, 360 to provide means for selectively bypassing either first heat exchanger 330 or second heat exchanger 366. For example, three-way valve 324 may be positioned so that the refrigerant stream is prevented from entering conduit 326 and is allowed to enter conduit 328. The refrigerant stream in conduit 328 flows through junction 354 to conduit 350, then through junction 348 to reach conduit 346. Four-way valve 336 is positioned to block flow from conduit 338. Likewise, valve 360 is positioned to block flow from conduit 352.

Thus, refrigerant flow in conduit 346 enters thermal storage device 356, passes through conduit 344 to expansion device 342, and enters conduit 340. Four-way valve 336 is positioned to allow flow from conduit 340 to pass through to conduit 343, from which the flow passes to second heat exchanger 366, conduit 362, and to conduit 320 with appropriate positioning of three-way valve 360. Similarly, second heat exchanger 366 can be bypassed under appropriate conditions by manipulation of the valves 336 and 360 as will be described further below. Controller 374 operates to control valves 324, 336, and 360 (as indicated by dashed lines 380, 376, 378 respectively) as well as four-way reversing valve 316 (as indicated by dashed line 372) and fans 332, 368 (as indicated by dashed lines 384, 382 respectively) based upon conditions sensed in thermal storage device 356 (as indicated by dashed line 370). Controller 374 also operates supplemental heater 358 as indicated by dashed line 383.

Figure 5:
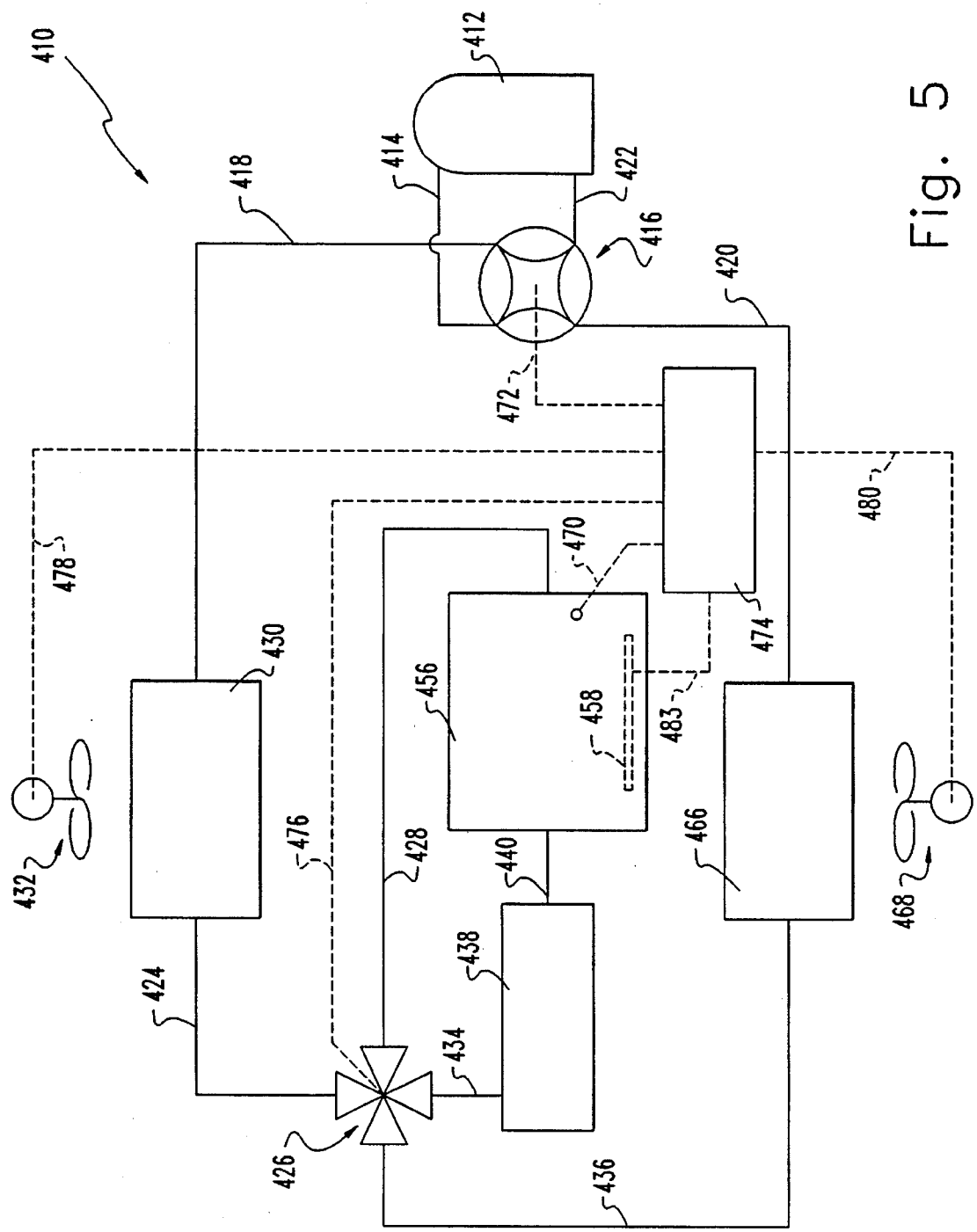
FIG. 5 is a diagrammatic view of yet another embodiment of a heat pump and air conditioning system showing a thermal storage device connected to a four-way valve and a control apparatus for controlling flow of refrigerant therethrough.

In system 410 of FIG. 5, an arrangement similar to that of FIG. 4 is illustrated. However, in FIG. 5, four-way valve 426 effectively controls the direction of flow in a subsidiary refrigerant circuit including an expansion device 438 and a thermal storage device 456. That is, a conduit 434 extends between four-way valve 426 and expansion device 438. Expansion device 438 is connected to thermal storage device 456 by way of a conduit 440. Another conduit 428 extends between thermal storage device 456 and four-way valve 426 to complete the subsidiary circuit (also referred to herein as the thermal storage circuit). By use of controller 474 to manipulate the position of four-way valve 426, the direction of refrigerant flow in the thermal storage circuit can be altered, again based upon conditions sensed in thermal storage device 456 as indicated by dashed line 470. In addition, controller 474 operates supplemental heater 458 as indicated by dashed line 483.

Figure 6:
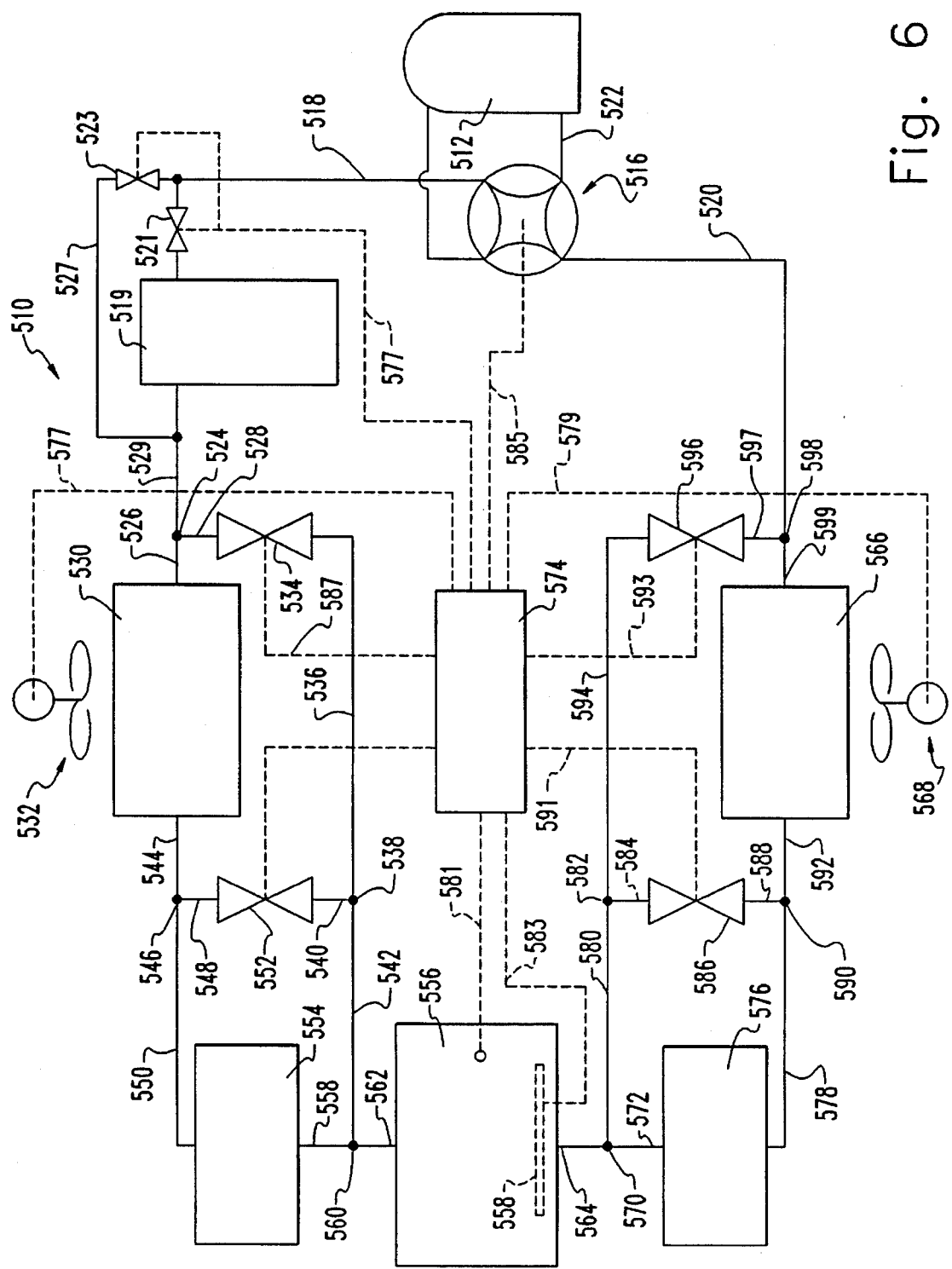
FIG. 6 is a diagrammatic view of the heat pump and air conditioning system of FIG. 2 incorporating a water heater.

System 510 illustrated in FIG. 6 is a variation of system 110 disclosed in FIG. 2. In system 510, a domestic water heater 519 is disposed between a conduit 518 and a conduit 529 to receive high temperature compressed refrigerant exiting from compressor 512. Water heater 519 is typically a standard water heater as is found in most residences. A water heater bypass conduit 527 and a series of valves 521, 523, will also typically be included in systems of the present design. Valves 521, 523 are controlled by controller 574 as indicated by dashed line 577. In other aspects, system 510 operates similarly to system 110 of FIG. 2.

Figure 7:
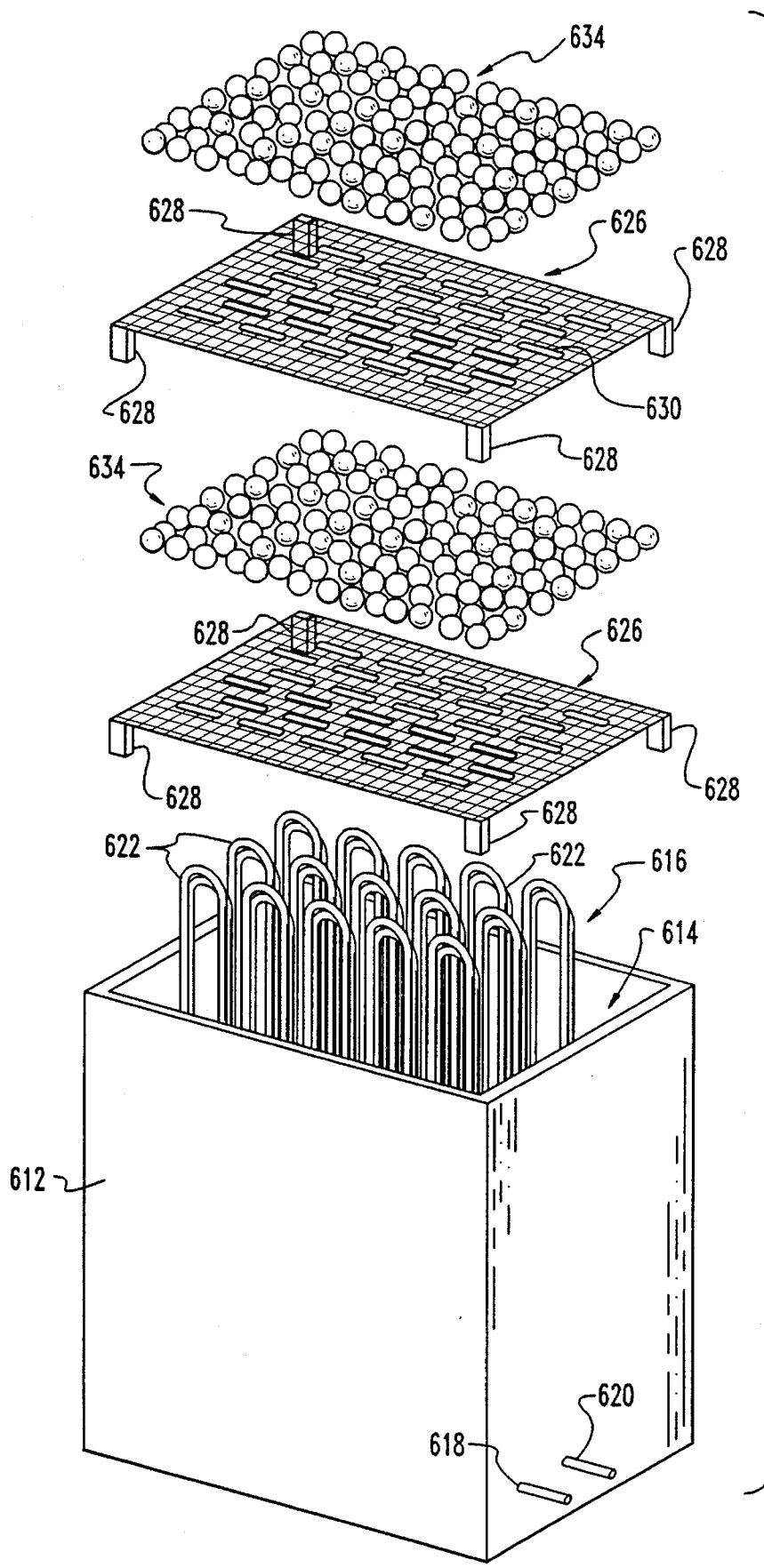
FIG. 7 is an exploded view of one embodiment of a thermal storage device in accordance with the present invention.
Figure 8:
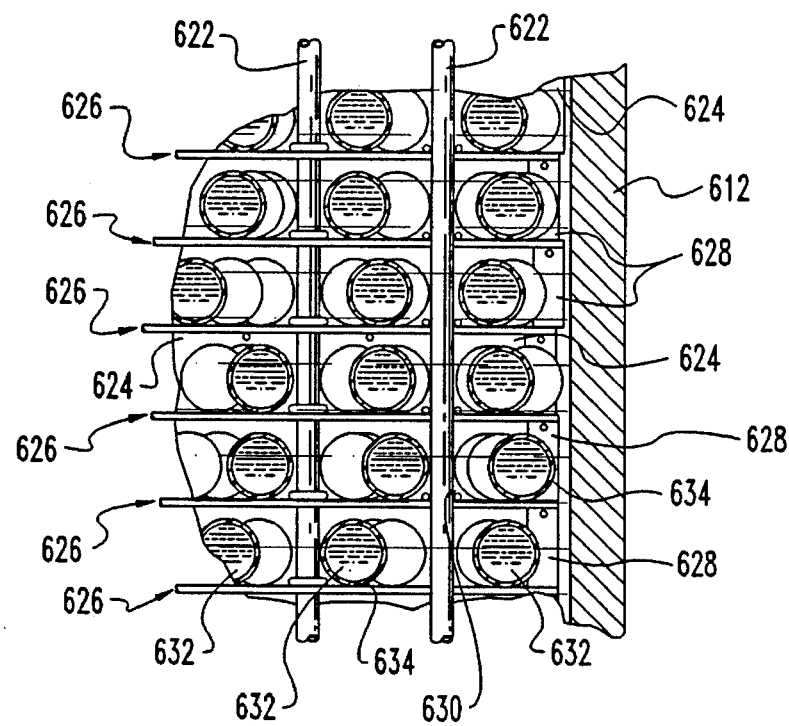
FIG. 8 is a partial sectional side view of the thermal storage device of FIG. 7 showing phase change capsules positioned on a series of grids.
Figure 9:
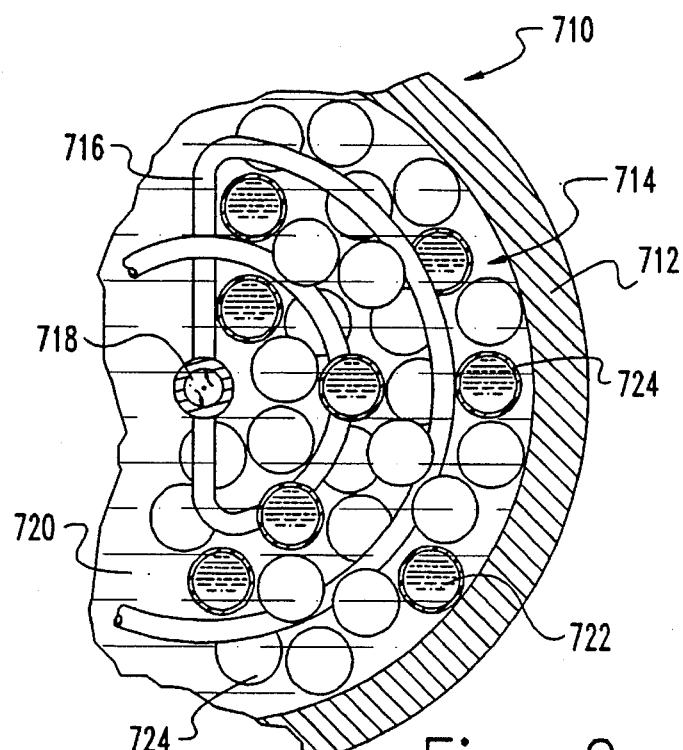
FIG. 9 is a partial sectional top view of another embodiment of a thermal storage device in accordance with the present invention showing a cylindrical container with phase change capsules disposed among helical refrigerant coils.

Preferred embodiments of thermal storage devices usable in connection with the present invention are illustrated in FIGS. 7-9. As shown in FIG. 7, one preferred embodiment of a thermal storage device 610 in accordance with the present invention includes a rectilinear insulated tank or container 612 defining an interior region 614.

A bank of refrigerant coils 616 is disposed in interior region 614 to provide means for conducting a refrigerant stream through interior region 614. Coil bank 616 includes an inlet 618 for admitting a refrigerant stream and an outlet 620 for discharging the refrigerant stream. As those of ordinary skill in the art will appreciate, the precise number of coils 622 in coil bank 616 may be varied according to the specific application. In addition, although coil bank 616 includes staggered rows of uniform, U-shaped coils 622, the arrangement and geometry of the coils likewise may be varied to meet requirements for specific applications.

A first, unencapsulated phase change material 624 (shown in its liquid state in FIG. 8) is disposed in interior region 614. Unencapsulated phase change material 624 is, for example, water, although other art recognized phase change materials may also be used. Unencapsulated phase change material 624 fills the interstices between coils and thus serves as a thermal conduction bath for transferring heat from coil bank 616. It also, of course, serves as a phase change material itself.

Thermal storage device 610 also optionally includes a plurality of stackable grids 626 disposed in interior region 614 in spaced-apart, parallel relationship. Grids 626 include legs 628 to allow for stacking, but may alternatively be provided with other stacking means, or, for example, may be removably received in slots formed in the inner walls of container 612. It will be appreciated that a wide variety of arrangements can be used to maintain grids 626 in spaced-apart relationship within interior region 614.

The number of grids 626 used in interior region 614 will depend upon the application. As will be described further below, for expected operation in a predominantly cold climate, a generally higher number of grids 626 will be used, while for operation in a predominantly warm climate, a generally lower number of grids 626 will be used. Of course, grids 626 can be omitted altogether.

Grids 626 are provided with a plurality of elongated openings 630 sized to slidably receive coils 622 of coil bank 616. Thus, grids 626 can be placed in interior region 614 or removed therefrom without disturbing coil bank 616.

An encapsulated phase change material 632 is also located in interior region 614 and is immersed in unencapsulated phase change material 624. For example, a plurality of phase change capsules 634 may be disposed upon grids 626 amidst coil bank 616. Capsules 634 may be filled 80–90% full with phase change material in its solid state as shown in FIG. 8 to allow expansion space for encapsulated material 632 during phase change, or may be filled nearly 100% full with phase change material 632 in its liquid state. Typical phase change materials for use in capsules 634 include formulations comprising $CaCl_2.6H_2O$.

Phase change material 632 has a melt temperature that is higher than that of phase change material 624. For example, a typical system might use $CaCl_2.6H_2O$ as the encapsulated phase change material 632 (melt temperature about 27° C.) and $H_2O$ as the unencapsulated phase change material (melt temperature about 0° C.).

A wide variety of art recognized geometries for capsules 634 may be used in the present invention. For example, capsules 634 may be spherical, oblong, or may be of complex, irregular geometries to allow nested stacking while maintaining space for immersion by unencapsulated phase change material 624. In addition, capsules 634 may be formed of flexible material and filled to capacity with phase change material 632 such that upon expansion or compression of phase change material 632, the walls of capsules 634 are free to flex.

Another embodiment of a thermal storage device in accordance with the present invention is illustrated in FIG. 9. Thermal storage device 710 includes an insulated cylindrical container 712 defining an interior region 714. A refrigerant coil 716 is disposed in interior region 714, the refrigerant coil including an inlet 718 for admitting refrigerant and an outlet (not shown) for discharging refrigerant.

Coil 716 is preferably a helical coil, although alternative configurations are contemplated as within the scope of the present invention. Coil 716 may, for example, comprise a plurality of connected rings, each ring of equal diameter.

An unencapsulated phase change material 720, typically water, is placed in interior region 714. In addition, another phase change material 722 is encapsulated in capsules 724 and capsules 724 are immersed in unencapsulated phase change material 720 in interior region 714. Although grids may be provided to support layers of capsules 724 in spaced-apart relationship, grids may be omitted.

The internal thermal storage device configurations illustrated in FIGS. 7–9 seek to maximize the surface area of phase change salt presented for heat transfer by using encapsulation. In addition, the inclusion of two types of phase change materials having differing melt temperatures allows thermal storage and release over a broader temperature range. The ability to easily vary the capsule arrangement and number allows further advantage in adjusting the temperatures and efficiencies for thermal storage and release.

The dimensions of container 612 (or container 712) can be varied according to the desired application. It may be desirable, for example, to provide a rectilinear container such as container 612 which is dimensioned to fit between wall or floor studs. Alternatively, containers such as container 612 might themselves be formed to serve as wall panels or floor panels. Containers may be sized to fit conveniently in storage space available in a residence (basement space, for example) or may even be buried outside the building to be conditioned.

While containers 612, 712 are typically closed, insulated steel tanks as shown, alternative designs within the scope of the present invention may rely upon different tank configurations. For example, a relatively inexpensive open-top bulk storage container might be used. In such designs, an insulating material is used which is immiscible with the contained phase change material and less dense than the phase change material when the material is in the liquid state. For example, such insulating material might include paraffins, mineral oil, or a mixture of such components. The insulating material will be disposed in a stratified layer above the contained phase change material to provide insulation. Such a configuration may be particularly desirable where the contained phase change material is a single, unencapsulated phase change material, rather than the dual phase change material system illustrated in the drawings.

I. HEATING MODE

A. Charging Cycle

Under appropriate ambient conditions, the heat pump and air conditioning systems of the present invention may be operating with excess heating capacity—for example, during daytime winter operation. This excess heating capacity is advantageously stored in the form of latent heat in the thermal storage device by using the thermal energy to liquefy the phase change material.

When system 10 of FIG. 1 is placed in the charging cycle in heating mode, four-way reversing valve 16 is positioned to allow flow of compressed refrigerant from conduit 14 to conduit 18. The refrigerant flows in conduit 18 toward three-way valve 24. Controller 74 has operated to close three-way valve 24 to conduit 26 and to open three-way valve 24 to conduit 28. The gaseous refrigerant stream thus flows into conduit 60 at junction 62. Because controller 74 has closed flow from conduit 64 through valve 72, refrigerant is forced to enter conduit 60 at junction 62.

Gaseous refrigerant then passes from conduit 60 though thermal storage device 56. The refrigerant transfers heat to the phase change medium, melting it; the refrigerant, in turn, is liquefied. Thermal storage device 56 therefore effectively acts as a condenser. Predominantly liquid refrigerant is discharged into conduit 54 and flows to junction 52. Controller 74 has positioned three-way valve 46 to prevent flow from conduit 48 to conduit 50. Thus, refrigerant passing through junction 52 flows into conduit 40. Controller 74 has positioned valve 36 to allow flow from conduit 40 to conduit 38.

Predominantly liquid refrigerant flowing in conduit 38 passes through expansion device 42 and exits into conduit 44. Controller 74 has positioned valve 46 to allow flow from conduit 44 through valve 46 to conduit 50. Refrigerant then enters second heat exchanger 66 (operating as an evaporator), where the refrigerant evaporates and absorbs heat from the evaporator medium because controller 74 has caused fan 68 to operate. Mainly gaseous, low pressure refrigerant thus flows in conduit 70 through controlled valve 72 to conduit 20 and then through four-way reversing valve 16 to reach conduit 22 to be returned to compressor 12. Controller 74 monitors the continuing charging cycle by sensing temperature in thermal storage device 56 as indicated by dashed line 76 and also by sensing the temperature of the space to be conditioned.

In system 110 of FIG. 2, controller 74 places the system in the heating mode, charging cycle, by positioning valve 134 to allow flow from conduit 128 to conduit 136. Valve 152 may be positioned to block flow between conduits 148 and 140, although system operation will be unaffected even if valve 152 remains in the open position. In addition, valve 186 is positioned to block flow between conduits 184 and 188 and valve 196 is positioned to block flow between conduits 194 and 197. Thus, refrigerant flowing in conduit 118 bypasses first heat exchanger 130 and first expansion device 154, flowing to conduit 128 when it reaches junction 124 and passing through valve 134 to conduit 136, then to conduit 142 to conduit 162, thereafter entering thermal storage device 156. There, the refrigerant transfers heat through the unencapsulated phase change material to the encapsulated phase change material and then exits through conduit 164.

Mainly liquid refrigerant then passes through junction 170 to conduit 172 and through second expansion device 176, discharging to conduit 178. Liquid refrigerant passes through junction 190 to conduit 192 and passes through second heat exchanger 166, where the refrigerant evaporates, absorbing heat from the evaporator medium. Finally, the mainly gaseous refrigerant returns to compressor 112 by way of conduit 199, conduit 120, four-way reversing valve 116, and conduit 122.

In system 210 of FIG. 3, controller 74 opens valve 233 to allow refrigerant flow to bypass first expansion device 236. Further, controller 74 closes valve 252 to force refrigerant to pass through second expansion device 260. Thus, gaseous, high temperature refrigerant flowing in conduit 218 passes through first heat exchanger 230 with minimal heat loss (controlled fan 232 is not operating at this time) and passes through conduit 224 to conduit 231. The refrigerant passes through valve 233 to conduit 234, flowing to conduit 242 when it reaches junction 240.

Refrigerant enters thermal storage device 256 and exits in mainly liquid form into conduit 244. The mainly liquid refrigerant then passes through junction 246 to conduit 248 to reach second expansion device 260, exiting into conduit 262. From there, refrigerant passes to conduit 270, through second heat exchanger 266 (where fan 368 is operating), and returns to compressor via conduits 220 and 222.

In system 310 of FIG. 4, controller 374 places the system in heating mode, charging cycle, by positioning valve 324 to allow flow from conduit 318 to conduit 328 while blocking flow through conduit 326, thus bypassing first heat exchanger 330. Controller 374 also places four-way valve 336 in a position allowing flow only from conduit 340 to conduit 343 to second heat exchanger 366. Finally, controller 374 operates to set valve 360 to a position allowing flow from conduit 362 to conduit 320 while blocking flow from conduit 352.

Thus, refrigerant flowing in conduit 318 passes through valve 324 to conduit 328, through junction 354 to conduit 350, and through junction 348 to conduit 346, where it enters thermal storage device 356. Mainly liquid refrigerant is discharged to conduit 344 and passes through expansion device 342 to conduit 340, where it flows through four-way valve 336 to reach conduit 343. From conduit 343, the mainly liquid refrigerant flows through second heat exchanger 366 with fan 368 in operation. Finally, mainly gaseous refrigerant returns to compressor 312 via conduits 362, 320, and 322.

In system 410 of FIG. 5, controller 474 manipulates valve 426 to place the system in the heating mode, charging cycle. Specifically, controller 474 positions valve 426 to allow flow from conduit 424 to conduit 428, and to allow flow from conduit 434 to conduit 436. Thus, refrigerant in conduit 418 passes through first heat exchanger 430 with minimal heat losses (fan 432 is off) and flows through conduit 424, through valve 426, to conduit 428, reaching thermal storage device 456. Mainly liquid refrigerant exits thermal storage device 456, flowing through conduit 440 to reach expansion device 438, then flows from conduit 434 through valve 426 to conduit 436. Liquid refrigerant then passes through second heat exchanger 466 and evaporates, thereafter returning to compressor 412 by way of conduits 420 and 422.

System 510 of FIG. 6 operates similarly to system 110 of FIG. 2 in the heating mode, charging cycle. It is possible that valve 521 may be closed and valve 523 opened in this configuration allowing flow to bypass water heater 519 by way of bypass conduit 527.

B. Discharging Cycle

The heat pump and air conditioning systems of the present invention operate in a discharging cycle in heating mode when the thermal energy stored in the thermal energy storage device is called upon for release to the system. That is, in the heating mode, discharging cycle, at least part of the phase change medium in the thermal storage device is in its liquid state. In the case where unencapsulated and encapsulated phase change materials are both used, both the unencapsulated phase change material and the encapsulated phase change material are usually partially in their liquid states. Thermal energy is discharged to the system by causing at least part of the encapsulated phase change material to return to its solid state, and is discharged as sensible heat from both the encapsulated and unencapsulated phase change materials.

In system 10 of FIG. 1 in heating mode, discharging cycle, four-way reversing valve 16 is positioned to allow flow from conduit 14 to conduit 18. Valve 24 is positioned to allow flow from conduit 18 to conduit 26 while blocking flow to conduit 28, and valve 36 is positioned to allow flow from conduit 34 to conduit 38 while blocking flow to conduit 40. Valve 46 is set to allow flow from conduit 44 to conduit 48 while blocking flow to conduit 50, and valve 72 is set to allow flow from conduit 64 to conduit 20 while blocking flow to conduit 70. As a result, in this configuration, refrigerant bypasses second heat exchanger 66.

Accordingly, refrigerant in conduit 18 passes through valve 24, through conduit 26, and into first heat exchanger 30 (with fan 32 on such that the first heat exchanger operates as a condenser), where it is liquefied. The mainly liquid refrigerant flows through conduit 34, conduit 38, expansion device 42, and conduit 44, reaching valve 46. There, the refrigerant passes to conduit 48, through junction 52, and into conduit 54 to enter thermal storage device 56. In thermal storage device 56 (which operates as an evaporator in this configuration), the liquid refrigerant stream absorbs heat from the phase change material and solidifies at least the encapsulated phase change material.

Mainly gaseous refrigerant exits thermal storage device 56 via conduit 60 and passes through junction 62 to conduit 64. From there, the refrigerant stream returns to compressor 12 by way of conduits 20, 22.

In system 110 of FIG. 2 in heating mode, discharging cycle, controller 174 positions valve 134 to block flow between conduits 128 and 136, and positions valve 152 to block flow between conduits 148 and 140. Controller 174 may also position valve 186 to block flow from conduit 184 to conduit 188 (although this is not necessary to system operation in this configuration) and positions valve 196 to allow flow from conduit 194 to conduit 197. Four-way reversing valve 116 remains positioned to allow flow from conduit 114 to conduit 118. Fan 168 is off.

Thus, refrigerant in conduit 118 flows through junction 124 to conduit 126 and through first heat exchanger 130 (with fan 132 on). Refrigerant then passes through conduits 144 and 150, expansion device 146, conduits 158 and 162, and thermal storage device 156. Having absorbed heat in device 156, the mainly gaseous refrigerant passes through conduits 164, 180, 194, and 197, returning to compressor 112 via conduits 120, 122.

In system 210 of FIG. 3 in heating mode, discharging cycle, controller 274 has positioned valve 233 in its closed position forcing refrigerant to flow through expansion device 236 and has positioned valve 252 in its open position allowing refrigerant to bypass expansion device 260. Four-way reversing valve is set to direct flow from conduit 214 to conduit 218.

Thus, in discharging stored heat, compressed refrigerant in conduit 218 flows through first heat exchanger 230 (with fan 232 on) in which it is condensed. The mainly liquid refrigerant then flows through conduits 224 and 228 to reach expansion device 236. The refrigerant then passes through conduits 238 and 242 to reach thermal storage device 256, in which it absorbs heat from the phase change material contained therein and solidifies the phase change material.

The mainly gaseous refrigerant then passes through conduit 244, conduit 250, valve 252, conduit 254, and conduit 270 to reach second heat exchanger 266 where fan 268 is off, such that heat transfer is minimal. Finally, refrigerant returns to compressor 212 by way of conduits 220 and 222.

In system 310 of FIG. 4 in heating mode, discharging cycle, controller 374 sets valve 324 to allow flow between conduits 318 and 326 while blocking flow from conduit 328. Controller 374 sets valve 336 to allow flow from conduit 334 to conduit 340 and to otherwise block flow. Valve 360 is positioned to allow flow from conduit 352 to conduit 320.

Thus, refrigerant in conduit 318 passes through conduit 326 and through first heat exchanger 330 (with fan 332 on) to reach conduit 334. The mainly liquid refrigerant passes through valve 336 to conduit 340, through expansion device 342, conduit 344, and enters thermal storage device 356. The refrigerant absorbs heat in device 356 and evaporates as noted with respect to previous embodiments. The mainly gaseous effluent refrigerant passes through conduit 346 and conduit 352, returning to compressor 312 by way of conduits 320, 322.

In system 410 of FIG. 5 in heating mode, discharging cycle, controller 474 positions valve 426 to allow flow from conduit 424 to conduit 434 and to allow flow from conduit 428 to conduit 436. In addition, controller 474 turns fan 432 on and fan 468 off. Thus, refrigerant in conduit 418 passes through first heat exchanger 430 (with fan 432 on), conduit 424, conduit 434, expansion device 438, conduit 440, and thermal storage device 456. After absorbing heat, the mainly gaseous refrigerant flows through conduits 428 and 436, through second heat exchanger 466 (with fan 468 off), and finally through conduits 420 and 422 to reach compressor 412.

The system of FIG. 6 works in similar fashion to that of FIG. 2.

II. COOLING MODE

A. Charging Cycle

When the heat pump and air conditioning system is operating with excess cooling capacity, the "coolness" can be stored using the thermal energy storage device. This charging cycle for the cooling mode is in many respects analogous to the discharge cycle of the heating mode.

In system 10 of FIG. 1, controller 74 places the system in cooling mode, charge cycle by positioning reversing four-way valve 16 to allow flow discharging from compressor 12 into conduit 14 to flow to conduit 20 rather than to conduit 18. Controller 74 also positions valve 72 to block flow to conduit 64, forcing refrigerant to flow through second heat exchanger 66. Controlled valve 46 is open to flow from conduit 50 to conduit 44 but closed to flow from conduit 50 to conduit 48, thus forcing refrigerant to flow through expansion device 42. Controlled valve 36 is open to flow from conduit 38 to conduit 40 but is closed to flow from conduit 38 to conduit 34, thus causing refrigerant to bypass first heat exchanger 30. Controlled valve 24 is closed to flow from conduit 26 but open to flow from conduit 28 to conduit 18.

Thus, refrigerant discharged from compressor 12 to conduit 14 flows to conduit 20, passing then through valve 72 to conduit 70 and through second heat exchanger 66, where it is liquefied. Mainly liquid refrigerant is discharged to conduit 50 and flows through valve 46 to conduit 44 and to expansion device 42, discharging to conduit 38. From conduit 38, the mainly liquid refrigerant flows through valve 36 to conduit 40, then through junction 52 to reach conduit 54. The refrigerant then enters thermal storage device 56, where it absorbs heat from the phase change material and evaporates, solidifying at least the encapsulated phase change material and thus storing "coolness."

The mainly gaseous refrigerant exits through conduit 60 and passes through junction 62 to conduit 28. It next passes through valve 24 to reach conduit 18, from which it returns to compressor 12 by way of conduit 22.

In system 110 of FIG. 2 in cooling mode, charging cycle, valve 116 is positioned to allow flow from conduit 114 to conduit 120 rather than to conduit 118. In addition, valve 196 is positioned to prevent flow from conduit 197 to conduit 194, and valve 186 is positioned to prevent flow from conduit 188 to conduit 184. Also, valve 152 may be positioned to prevent flow from conduit 140 to conduit 148 (although this is not necessary) and valve 134 is positioned to allow flow from conduit 136 to conduit 128. Thus, in this configuration, refrigerant flows through second heat exchanger 166, expansion device 176, and thermal storage device 156, but bypasses expansion device 154 and first heat exchanger 130.

Specifically, refrigerant in conduit 120 passes through junction 198 to conduit 199 and reaches second heat exchanger 166 (with fan 168 on), where the refrigerant is liquefied. Refrigerant then passes through conduit 192, through junction 190 to conduit 178, and through expansion device 176. Refrigerant next flows through conduit 172, junction 170, and conduit 164 to enter thermal storage device 156, where it absorbs heat and evaporates while solidifying the phase change material in thermal storage device 156.

Mainly gaseous refrigerant exiting thermal storage device 156 passes through conduit 162, through junction 160 to conduit 142, and through junction 138 to conduit 136. From there the refrigerant passes through valve 134 to conduit 128, thus bypassing first heat exchanger 130 (with fan 132 off). Finally, the refrigerant returns to compressor 112 by way of conduits 118 and 122.

In system 210 of FIG. 3 in cooling mode, charging cycle, four-way reversing valve is set to allow flow from conduit 214 to conduit 220, valve 252 is closed to force refrigerant to flow through expansion device 260, and valve 233 is open to allow refrigerant to bypass expansion device 236. Thus, refrigerant flows in conduit 220 through second heat exchanger 266 (now acting as a condenser with fan 268 operating) and passes through conduit 270, junction 264, and conduit 262 to reach expansion device 260. The mainly liquid refrigerant then flows through conduits 248, 244 to reach thermal storage device 256. The mainly liquid refrigerant absorbs heat in the thermal storage device and evaporates, and at least the encapsulated phase change material solidifies. The mainly gaseous refrigerant then flows through conduit 242, junction 240, conduit 234, and through valve 233 to conduit 231. From there it passes through junction 226 to conduit 224 and flows through first heat exchanger 230 (with fan 232 off such that heat losses are minimal). The mainly gaseous refrigerant then returns to compressor 212 by way of conduits 218 and 222.

In system 310 of FIG. 4 in cooling mode, charging cycle, three-way valve 360 is positioned to allow flow from conduit 320 to conduit 362 while blocking flow to conduit 352. Four-way valve 336 is positioned to allow flow from conduit 343 to conduit 340. Three-way valve 324 is positioned to allow flow from conduit 328 to conduit 318 while blocking flow from conduit 326, thus forcing refrigerant to bypass first heat exchanger 330. Thus, refrigerant in conduit 320 passes through conduit 362, second heat exchanger 366 (with fan 368 operating), conduit 343, conduit 340, expansion device 342, conduit 344, and thermal storage device 356, in which it evaporates. Mainly gaseous refrigerant passes through conduits 346, 350, and 328, finally returning to compressor by way of conduits 318 and 322.

In system 410 of FIG. 5 in cooling mode, charging cycle, four-way valve 426 is positioned to allow flow from conduit 436 to conduit 434 and from conduit 428 to conduit 424. Thus, refrigerant in conduit 420 passes through second heat exchanger 466 (with fan 468 on), conduit 436, conduit 434, expansion device 438, conduit 440, and thermal storage device 456. After absorbing the thermal energy, mainly gaseous refrigerant passes through conduit 428, conduit 424, and first heat exchanger 430 (with fan 432 off), returning then to compressor 412 by way of conduits 418 and 422.

System 510 of FIG. 6 works similarly to system 210 of FIG. 2.

B. Discharging Cycle

During system operation during times of high cooling demand—for example, daytime summer operation—the heat pump and air conditioning system of the present invention is configured to discharge stored "coolness" from the phase change material in the thermal energy storage device, thereby reducing overall system power consumption and increasing system cooling capacity. System operation in the cooling mode, discharging cycle is in many respects analogous to operation in the heating mode, charging cycle.

In system 10 of FIG. 1 in cooling mode, discharging cycle, four-way reversing valve 16 is set to allow flow from conduit 14 to conduit 20 and from conduit 18 to conduit 22. In addition, valve 72 is positioned to allow flow from conduit 20 to conduit 64, blocking flow to conduit 70. Valve 46 is positioned to block flow to conduit 50, while allowing flow from conduit 48 to conduit 44. Valve 36 is positioned to allow flow from conduit 38 to conduit 34 while blocking flow from conduit 40. Finally, valve 24 is positioned to block flow from conduit 28 while allowing flow from conduit 26 to conduit 18. Thus, refrigerant bypasses second heat exchanger 66 (fan 68 is off) but passes through first heat exchanger 30.

In particular, refrigerant in conduit 20 passes through conduit 64 and conduit 60 to reach thermal storage device 56, where the refrigerant absorbs "coolness" from the solidified phase change materials. The refrigerant liquifies and at least the unencapsulated phase change material melts. The mainly liquid refrigerant exits by way of conduit 54, then passes through conduit 48, conduit 44, expansion device 42, conduit 38, conduit 34, and first heat exchanger 30 (with fan 32 on). Finally, the refrigerant passes through conduits 26, 18, and 22 to return to compressor 12.

In system 110 of FIG. 2 in cooling mode, discharging cycle, controller 174 positions valve 196 to allow flow from conduit 197 to conduit 194 and may position valve 186 to block flow between conduits 184 and 188, although this is not necessary. In addition, controller 174 positions valve 152 to prevent flow between conduits 140 and 148 and positions valve 134 to prevent flow between conduits 136 and 128. Thus, refrigerant in conduit 120 flows through conduits 197, 194, 180, and 164 to reach thermal storage device 156, where it absorbs "coolness" and liquifies. The mainly liquid refrigerant then flows through conduits 162 and 158, passes through first expansion device 154, and flows through conduits 150 and 144 to reach first heat exchanger 130 (with fan 132 on). From there, the refrigerant stream returns to compressor 112 by way of conduits 126, 118, and 122.

In system 210 of FIG. 3 in cooling mode, discharging cycle, controller 274 positions valve 252 to allow flow from conduit 254 to conduit 250 and positions valve 233 to block flow from conduit 234 to conduit 231. Thus, refrigerant in conduit 220 flows through second heat exchanger 266 (with fan 268 off such that heat losses are minimal), conduits 270 and 254, conduit 250, and conduit 244 to enter thermal storage device 256. There, it absorbs "coolness" and liquifies, exiting through conduit 242 and passing from there through conduit 238, first expansion device 236, and conduits 228 and 224 to reach first heat exchanger 230 (with fan 232 on). Finally, the refrigerant stream returns to compressor 212 by way of conduits 218, 222.

In system 310 of FIG. 4 in cooling mode, discharging cycle, valve 360 is positioned to allow flow from conduit 320 to conduit 352, valve 336 is positioned to allow flow from conduit 340 to conduit 334, and valve 324 is positioned to allow flow from conduit 326 to conduit 318. Thus, refrigerant in conduit 320 flows through conduit 352 and conduit 346 to reach thermal storage device 356. Refrigerant exits thermal storage device 356 and flows through expansion device 342, conduit 340, conduit 334, and first heat exchanger 330 (with fan 332 on). Refrigerant exits to conduit 326 and passes from there to compressor 312 by way of conduits 318 and 322.

In system 410 of FIG. 5, valve 426 is positioned to allow flow from conduit 436 to conduit 428 and to allow flow from conduit 434 to conduit 424. In addition, controller 474 operates to turn fan 468 off and fan 432 on. Thus, refrigerant in conduit 420 flows through second heat exchanger 466 (with fan 468 off), conduit 436 and conduit 428 to reach thermal storage device 456, where it transfers heat with the phase change material contained therein. The mainly liquid effluent refrigerant stream flows through conduit 440, expansion device 438, and conduit 434, then passes through four-way valve 426 to conduit 424 to reach first heat exchanger 430 (with fan 432 on). The refrigerant stream exits into conduit 418 and returns to compressor 412 via conduit 422.

System 510 of FIG. 6 operates in similar fashion to system 110 of FIG. 2.

III. BYPASS MODE

For operation of the systems of the present invention in certain conditions, it may not be necessary to store or retrieve thermal energy from the thermal energy storage device. Thus, the systems of the present invention provide for effective bypass of the thermal storage device under appropriate conditions.

In system 10 of FIG. 1 operating in bypass mode, controller 74 positions valve 24 to allow refrigerant flow between conduits 18 and 26, and positions valve 36 to allow flow between conduits 34 and 38. Further, controller 74 positions valve 46 to allow flow between conduits 44 and 50, and positions valve 72 to allow flow between conduits 70 and 20. Thus, refrigerant passes through first heat exchanger 30 (with fan 32 on), expansion device 42, and second heat exchanger 66 (with fan 68 on) but bypasses thermal storage device 56. Controller 74 may set four-way reversing valve 16 to allow flow from conduit 14 to conduit 18, or alternatively may set valve 16 to allow flow from conduit 14 to conduit 20.

In system 110 of FIG. 2, controller 174 closes valve 134, blocking flow between conduits 128 and 136, and likewise closes valve 196, blocking flow between conduits 194 and 197. Valves 152 and 186 may be closed or open, depending upon flow direction. That is, where flow from compressor 112 and conduit 114 is directed to conduit 118, valve 152 is open and valve 186 is closed. Thus, in this configuration, refrigerant passes through first heat exchanger 130 (with fan 132 on), bypasses first expansion device 154, then passes through thermal storage device 156, second expansion device 176, and second heat exchanger 166 (with fan 168 on). However, although refrigerant passes through thermal storage device 156, the temperature of the refrigerant stream is such that no phase change occurs. The thermal storage device 156 is therefore effectively "bypassed" in this configuration.

Alternatively, where flow from compressor 112 and conduit 114 is directed to conduit 120, valve 152 is closed and valve 186 is open. That is, in this configuration, refrigerant flows through second heat exchanger 166 (with fan 168 on), thermal storage device 156, first expansion device 154, and first heat exchanger 130 (with fan 132 on). Here again, the no phase change occurs in thermal storage device 156; the device is effectively "bypassed."

In system 210 of FIG. 3 in bypass mode, controller 274 positions valves 233, 252 in either open or closed positions, depending flow direction. Where flow from compressor 212 and conduit 214 is directed to conduit 218, valve 233 is open and valve 252 is closed, such that refrigerant flows through first heat exchanger 230 (with fan 232 on), thermal storage device 256 (no phase change occurring), second expansion device 260, and second heat exchanger 266 (with fan 268 on). Alternatively, where flow from compressor 212 and conduit 214 is directed to conduit 220, refrigerant flows through second heat exchanger 230 (with fan 232 on), thermal storage device 256 (with fan 268 on), first expansion device 236, and first heat exchanger 230 (with fan 232 on).

In system 310 of FIG. 4, where flow from compressor 312 and conduit 314 is directed to conduit 318, controller 374 positions valve 324 to allow flow between conduits 318 and 326 and positions valve 360 to allow flow between conduits 362 and 320. Further, controller 374 positions four-way valve 336 to allow flow between conduits 334 and 338 and between conduits 340 and 343. Thus, refrigerant passes through first heat exchanger 330 (with fan 332 on), thermal storage device 356 (no phase change occurring), expansion device 342, and second heat exchanger 366. Alternatively, where flow is reversed, controller 374 manipulates valves 360, 336, and 324 so that refrigerant flows through second heat exchanger 366 (with fan 368 on), thermal storage device 356 (no phase change occurring), expansion device 342, and first heat exchanger 330 (with fan 332 on).

In system 410 of FIG. 5, where flow is from compressor 412 through conduit 414 to conduit 418, controller 474 positions four-way valve 426 to allow flow between conduits 424 and 428 and between conduits 434 and 436. Thus, refrigerant passes through first heat exchanger 430 (with fan 432 on), thermal storage device 456 (no phase change occurring), expansion device 438, and second heat exchanger 466 (with fan 468 on). Again, where flow is reversed, controller 474 manipulates valve 426 to allow flow from conduit 436 to conduit 428 and from conduit 434 to conduit 424. Thus, in this configuration, refrigerant flows through second heat exchanger 466 (with fan 468 on), thermal storage device 456 (no phase change occurring), expansion device 438, and first heat exchanger 430 (with fan 432 on).

System 510 of FIG. 6 operates similarly to system 110 of FIG. 2 in bypass mode.

IV. MIXED MODE

Systems in accordance with the present invention may also be operated in a "mixed" mode in which refrigerant flows in parallel through both a heat exchanger and the thermal storage device. For example, in system 10 of FIG. 1, controller 74 may position valve 24 to allow a portion of refrigerant flow in conduit 18 to enter conduit 26, while allowing another portion to enter conduit 28. Valve 36 in turn is positioned to receive flow from both conduits 36 and 40, delivering the combined flow to conduit 38. Fans 32 and 68 both typically operate in this configuration, although fan 36 may be controlled to operate at a lower speed.

In another mixed mode configuration, valve 46 may be positioned to receive flow from conduit 44 and to deliver a portion of the flow to conduit 48 and another portion to conduit 50. Valve 72 is in turn positioned to receive flow from both conduits 64 and 70, delivering the combined flow to conduit 20. Again, both fans 32 and 68 typically operate, although fan 68 may operate at a lower speed.

The system may be operated in mixed mode to achieve either heating or cooling, and either thermal storage charging or discharging. For example, the system may operate in mixed mode to serve a light heating demand in one portion of a space to be conditioned while simultaneously operating to charge the thermal storage device.

In another mixed mode configuration particularly applicable to the systems of FIGS. 3 and 5, the fans of the first and second heat exchangers can be run at lower speed so that liquefying of the refrigerant is carried out in part in the thermal storage device, and partly in one of the heat exchangers. Analogously, partial evaporation can be carried out in the thermal storage device and in one of the heat exchangers.

V. ADDITIONAL EMBODIMENTS

Figure 10:
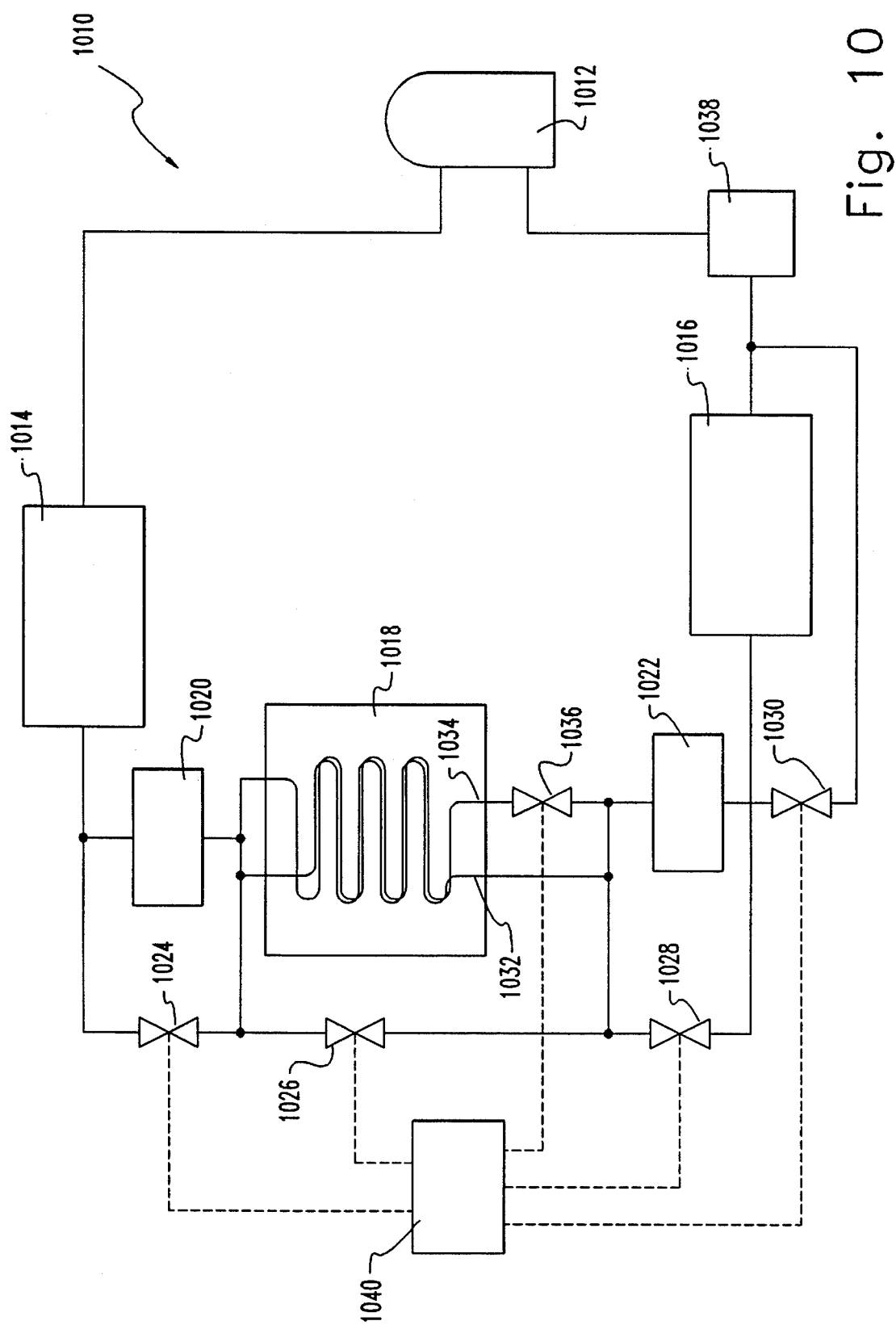
FIG. 10 is a diagrammatic view of one embodiment of an air conditioning or refrigeration system in accordance with the present invention incorporating a thermal storage device, the system being operable in a conventional cycle, a charging cycle, and a discharging cycle.

Another embodiment of an air conditioning or refrigeration system in accordance with the present invention is illustrated in FIG. 10. In this embodiment, system 1010 includes a main flow loop including a compressor 1012, an outside coil 1014, an inside coil 1016, and a thermal storage device 1018. As shown, thermal storage device 1018 is positioned in a first bypass line extending from the outlet of outside coil 1014 to the outlet of inside coil 1016, thus allowing inside coil 1016 to be completely bypassed as described below. These components are connected as described with regards to previous embodiments to allow a working fluid, typically a standard refrigerant, to be circulated among them.

A wide variety of phase change materials may be used in the thermal storage devices used in the embodiments of FIGS. 10–14. Representative phase change materials include those previously described in connection with previous embodiments. A particularly preferred phase change material used in connection with the embodiments of FIGS. 10–14 is water.

The design of the internal structure of thermal storage device 1018 may vary. Designs such as those disclosed in FIGS. 7–9 are acceptable, but other designs familiar to those or ordinary skill in the art may also be used. In addition to the design features shown therein, agitation can be provided to the phase change materials when in the liquid phase to prevent temperature stratification and to enhance heat exchange between the phase change materials and the refrigerant coil surface.

System 1010 also includes metering devices 1020, 1022 as well as valves 1024, 1026, 1028, and 1030. Metering devices 1020, 1022 are both located in the first bypass line. Valve 1030 is located in a second bypass line which extends from the inlet of inside coil 1016 to the outlet of inside coil 1016 and communicates with the first bypass line. Working fluid flowing in the first bypass line can flow into the second bypass line and completely bypass inside coil 1016 when valve 1030 is open. A controller 1040 may also be provided for operating valves 1024, 1026, 1028, and 1030 according to preselected parameters supplied by the user through a standard interface. These components can be arranged as shown in the flow diagram of FIG. 10 for refrigerant flow therethrough to allow system 1010 to be operated in conventional, charging, and discharging cycles.

In the "conventional" cycle as that term is used in connection with the embodiments of FIGS. 10–14, the thermal storage device is bypassed completely. For operation of system 1010 in a conventional cycle, valves 1026 and 1028 are open, while valves 1024 and 1030 are closed. Thus, refrigerant from compressor 1012 flows through outside coil 1014 and then through metering device 1020 and open valves 1026, 1028 ultimately reaching inside coil 1016. From inside coil 1016, refrigerant flows back to compressor 1012.

Typically, system 1010 might be operated in its conventional cycle during off-peak hours in which there is no need to take advantage of energy which may be stored in the phase change materials contained in thermal storage device 1018. Thus, stored energy in device 1018 can be maintained for use during on-peak operation periods.

Air conditioning or refrigeration system 1010 can also be operated to store cooling capacity during off-peak hours for on-peak recovery. For example, where the phase change material contained in thermal storage device 1018 is water, the water can be frozen and cooling capacity thus can be stored. In this cycle, referred to herein as a "charging cycle," valves 1024 and 1026 are closed, while valves 1028 and 1030 are open. Accordingly, refrigerant flows from compressor 1012 through outside coil 1014, metering device 1020 and thermal storage device 1018. Because valve 1028 is open, refrigerant bypasses metering device 1022. Because valve 1030 is open, refrigerant can flow through the second bypass line bypassing completely inside coil 1016 and returning directly to compressor 1012.

System 1010 can also be operated in a discharging cycle to discharge stored energy during peak demand periods. Here, valve 1024 is open (allowing metering valve 1020 to be bypassed), while valves 1026, 1028, and 1030 are closed. In this configuration, refrigerant or working fluid flows from compressor 1012, through outside coil 1014, through open valve 1024, and from there directly to thermal storage device 1018. Upon leaving thermal storage device 1018, refrigerant flows through metering device 1022 and then through inside coil 1016 before returning to compressor 1012.

Advantageously, system 1010 may allow the elimination of one or more stages of the compressor. That is, a single-stage compressor in this configuration works as a first stage of a two-stage compressor in the discharging cycle and as a second stage of a two-stage compressor in the charging cycle. Advantageously, then, multi-stage compressors may in some circumstances be replaced with single-stage compressors in systems in configured in accordance with the present invention.

For example, if system 1010 were operated solely in the conventional cycle (i.e. with no use of thermal storage) using R-22 refrigerant (condensing temperature 130° F. (54° C.), evaporating temperatures −40° F. (−40° C.)) and a single-stage compressor, the compressor ratio would be unacceptably high, approximately 20.5 (the discharge pressure at the compressor, 311.5 psia (21.5 MPa), divided by the suction pressure, 15.2 psia (0.104 MPa)). Yet using a multi-stage compressor in the system would create complications.

On the contrary, by providing system 1010 with the capability to utilize thermal storage device 1018 in both the charging and discharging cycles, a single-stage compressor can be used and the compressor ratios will be well within acceptable limits. In the charging cycle, assuming that water is used as the phase change material, the refrigerant temperature would need to be reduced from 130° F. (54° C.) to about 22° F. (−5° C.) to freeze the phase change materials at 32° F. (0° C). The compressor acts as the second stage of a two-stage compressor, and the compressor ratio is only about 5.2. Similarly, in the discharging cycle, in which the compressor acts as the first stage of a two-stage compressor, the compressor ratio would be about 5.71, again within acceptable limits.

As an additional feature of the present invention, thermal storage device 1018 may be designed to work not only as a condenser, but also as a downstream "subcooler" in the discharging cycle. This may be accomplished by providing a pair of heat exchanger coils 1032, 1034 extending through the interior of thermal storage device 1418. A valve 1036 is also provided to interrupt flow through one of the coils (coil 1034 in FIG. 10). In this configuration, refrigerant is condensed in outside coil 1014, then flows through valve 1024. The refrigerant (now primarily liquid) is subcooled in coil 1032 in thermal storage device 1018 while being blocked by closed valve 1036 from flowing through coil 1034. That is, because refrigerant flow through coil 1034 is blocked, heat transfer between the phase change materials and the refrigerant occurs only through coil 1032. Consequently, thermal storage device 1018 does not work as a condenser in this configuration.

Refrigerant exiting from thermal storage device 1018 in coil 1032 passes through metering device 1022 and then passes through inside coil 1016, returning to compressor 1012 as described above. Those of ordinary skill in the art will appreciate that a dual-coil arrangement such as has been described and illustrated with regards to this embodiment may also be incorporated into the other embodiments of the present invention described below.

Tests of system 1010 have shown that it is capable of achieving better evaporation temperatures than standard systems having no thermal storage capability. For example, when a reciprocating compressor (EADB-0200-CAB, manufactured by Copeland) was used in system 1010, an evaporating temperature of −62° F. (−52° C.) was achieved, as compared to −40° F. (−40° C.) for a standard system. When a scroll compressor (23ZR, manufactured by Copeland) was used in system 1010, an evaporating temperature of −40° F. (−40° C.) was achieved, as compared to −20° F. (−29° C.) in a standard system.

Figure 11:
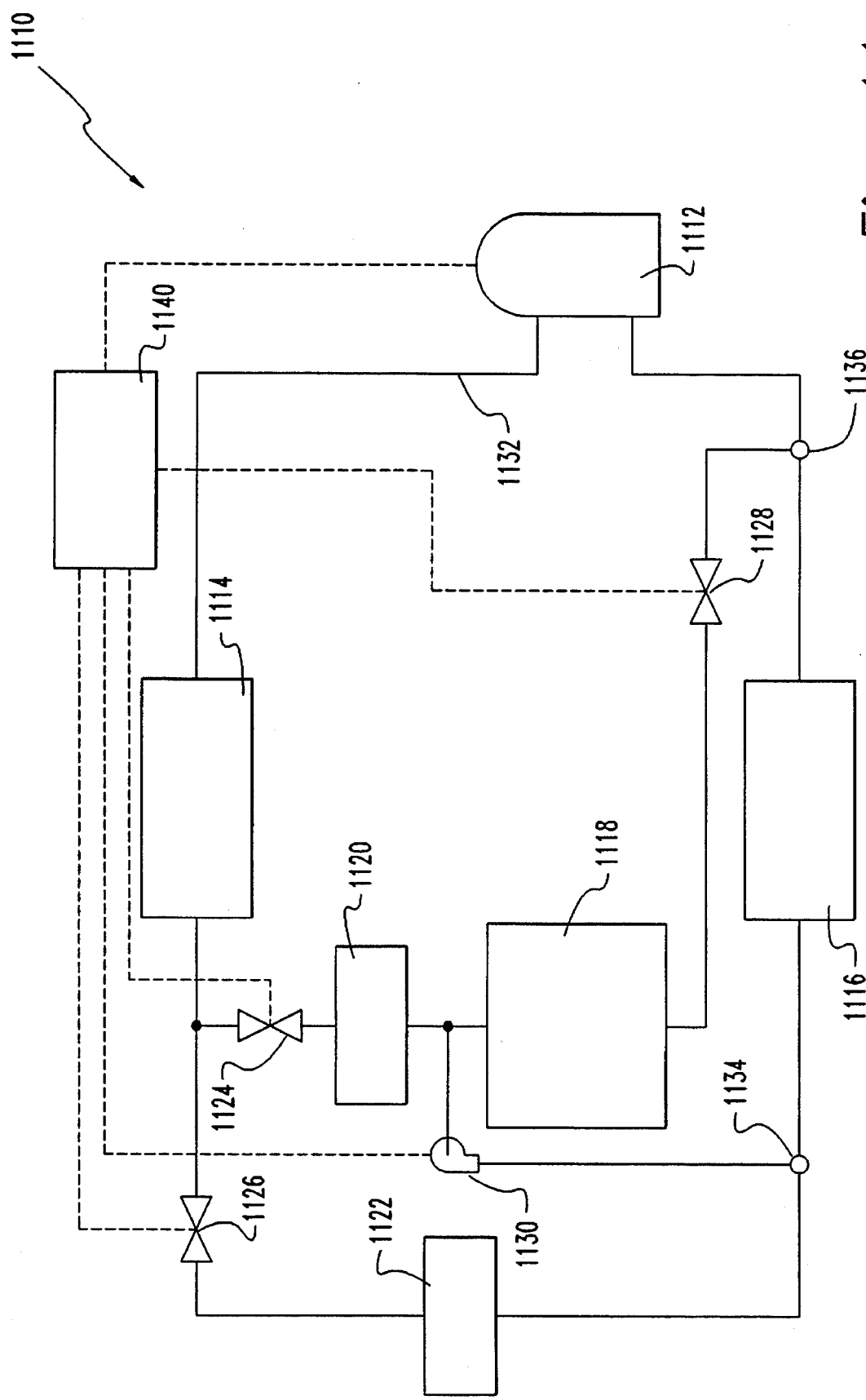
FIG. 11 is a diagrammatic view of another embodiment of an air conditioning or refrigeration system in accordance with the present invention incorporating a thermal storage device and a refrigerant pump, the system being operable in a conventional cycle, a charging cycle, and a discharging cycle in which refrigerant can flow in both a main flow loop and in a bypass line.

Yet another embodiment of the present invention is illustrated in FIG. 11. As shown, a system 1110 includes a main flow loop including a compressor 1112, outside and inside coils 1114, 1116, and a thermal storage device 1118. Thermal storage device 1118 is positioned in a bypass line extending between the outlet of outside coil 1114 and the outlet of inside coil 1116, allowing inside coil 1116 to be bypassed.

Also included are metering devices 1120, 1122, valves 1124 and 1126, and optional valve 1128. Metering device 1120 is located in the bypass line, while metering device 1122 is located in the main flow loop. Valves 1124 and 1128 are located in the bypass line, and valve 1126 is located in the main flow loop. A controller 1140 may also be provided.

System 1110 also includes a working fluid pump 1130 positioned between thermal storage device 1118 and the inlet of inside heat exchanger 1116. Pump 1130 may be any of a variety of standard refrigerant pumps well known to those of ordinary skill in the art, including, for example, metering pumps and centrifugal pumps.

For operation of the embodiment of FIG. 11 in the conventional cycle, valves 1124 and 1128 are closed to flow, while valve 1126 is open. Refrigerant exiting compressor passes through outside coil 1114, valve 1126, metering device 1122, and inside coil 1116, thus bypassing thermal storage device 1118. It then returns to compressor 1112.

Air conditioning/refrigeration system 1110 can also be operated in a charging cycle in which valves 1124 and 1128 are opened, while valve 1126 is closed. Refrigerant exiting compressor 1112 travels through outside coil 1114 and through open valve 1124 and metering device 1120 to reach thermal storage device 1118. After absorbing heat from the phase change materials in thermal storage device 1118, refrigerant passes through open valve 1128 and returns to compressor 1112. Thus, the phase change materials inside thermal storage device 1118 freeze as a result of direct expansion of the refrigerant or other working fluid. Advantageously, thermal storage device 1118 effectively works as an evaporator in this configuration.

System 1110 can then be operated to discharge stored cooling capacity during peak demand periods. Refrigerant flow is initiated in the bypass line by closing off valves 1124 and 1126, while leaving valve 1128 open. Compressor 1112 is taken off-line in this configuration. Pump 1130 is operated to cause mainly liquid refrigerant to flow to inside coil 1116, where it picks up heat and discharges "coolness" to the space to be conditioned. The refrigerant, now primarily vapor, passes through open valve 1128 to return to thermal storage device 1118. Advantageously, the power requirements for pump 1130 are relatively low, allowing the use of alternative energy sources including solar, battery, wind, and co-generation for on-peak discharge.

Refrigerant flow can also simultaneously be initiated in the main flow loop by opening valve 1126 and turning on compressor 1112. Thus, hot refrigerant exiting compressor 1112 passes through outside coil 1114, in which it is liquified. Because valve 1124 is closed, the liquid refrigerant exiting outside coil 1114 is forced to flow through open valve 1126 and then through metering device 1122.

At junction 1134, the flow of refrigerant from metering device 1122 is joined by the refrigerant flow being pumped from pump 1130. The combined flow then passes through inside coil 1116 for discharge to the space being cooled. At junction 1136, the vapor flow can branch off through open valve 1128 to return to thermal storage device 1118, and can also return to compressor 1112.

Advantageously, system 1110 can achieve very rapid cool-down by using the simultaneous discharging cycles in both the main flow loop and the bypass line as described above. That is, system 1110 stores cooling capacity in off-peak hours and uses that stored cooling capacity to shave peak load during the on-peak hours. In current refrigeration systems, designers typically provide excess cooling capacity to adequately attempt to handle rapid cooling and extremely high ambient temperatures during peak demand periods. No such excess capacity is needed for systems of the present invention because thermal storage device 1118 is not called upon to play the role of a "coolness" accumulator to condense vapor after it exits inside coil 1116.

In addition, the illustrated system 1110 may enable significant reductions in compressor capacity as compared to similar systems without loss in performance. A 2-ton compressor, for example, may be usable where a conventional system would have required a 4-ton compressor.

Figure 12:
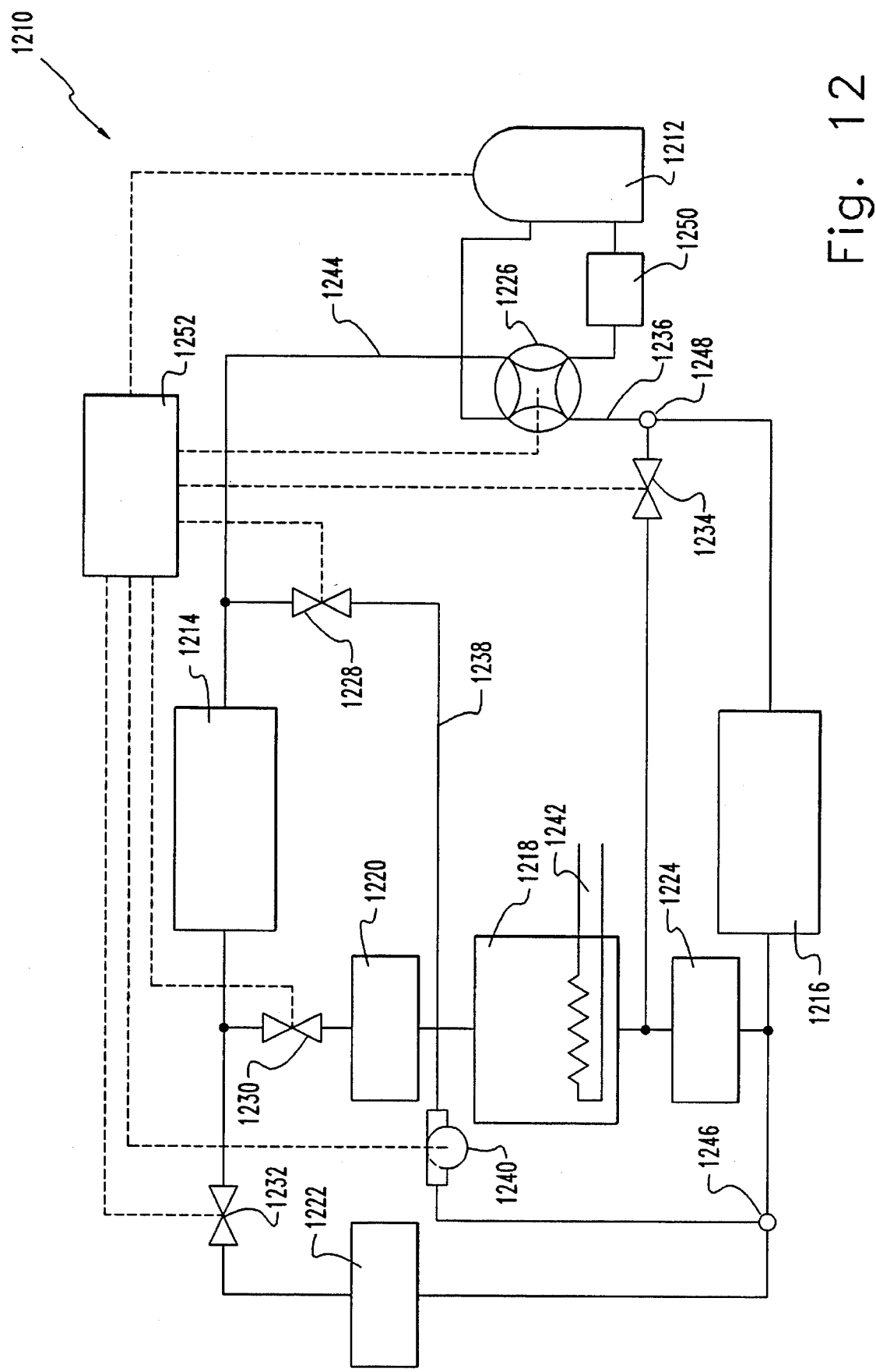
FIG. 12 is a diagrammatic view of yet another embodiment of a heating and cooling system in accordance with the present invention incorporating a thermal storage device and a refrigerant pump, the system being operable in a conventional cycle, a charging cycle, and a discharging cycle in which refrigerant can flow in both a main flow loop and in at least one of two bypass lines.

Another embodiment of the present invention is illustrated in FIG. 12. In this embodiment, the illustrated system may be operated as both a heat pump and as an air conditioning or refrigeration system. As shown, a heat pump and air conditioning/refrigeration system 1210 includes a compressor 1212, outside and inside coils 1214, 1216, and a thermal storage device 1218. Metering devices 1220, 1222, and 1224 are provided. In addition, a reversing valve 1226 as well as valves 1228, 1230, 1232, and 1234 are also provided. System 1210 also includes a refrigerant pump 1240 as described in connection with the embodiment illustrated in FIG. 11. A controller 1252 may also optionally be provided. Likewise, a liquid separator 1250 may be provided.

For operation in the conventional cycle as a heat pump/air conditioning system, valve 1232 is opened while valves 1228, 1230, and 1234 are all closed. This allows refrigerant to flow from compressor 1212 through reversing valve 1226 to outside coil 1214, and then through open valve 1232 and through metering device 1222 to inside coil 1216. From there, refrigerant can return to compressor 1212 by way of reversing valve 1226. Thermal storage device 1218 is completely bypassed in this cycle. Of course, by changing the position of reversing valve 1226, refrigerant flow can be reversed and the above-described steps carried out in reverse order.

System 1210 can also be operated as a heat pump incorporating thermal storage device 1218. For operation of system 1210 as a heat pump in a charging cycle, valves 1230 and 1234 are opened, while valves 1228 and 1232 are closed. Refrigerant flows from compressor 1212 through 1226, which is positioned to direct flow to conduit 1236.

Because valve 1234 is open, the refrigerant in conduit 1236 can flow through valve 1234 to reach thermal storage device 1218, releasing heat to the phase change materials contained within device 1218. Refrigerant then exits thermal storage device 1218 and flows through metering device 1220. Because valve 1230 is also open, refrigerant can flow to outside coil 1214, thereafter returning to compressor 1212 by way of reversing valve 1226. An optional auxiliary heater 1242 may also be used to assist in charging the phase change materials in thermal storage device 1218.

With the present embodiment, the discharging cycle (for heat pump operation) can occur either in one of two bypass flow loops or simultaneously in both the main flow loop and in one of the bypass flow loops. To initiate flow in a first of the bypass flow loops, valve 1228 is open, but valves 1230, 1232, and 1234 are all closed. Refrigerant exiting compressor 1212 and passing through reversing valve 1226 is directed through conduit 1236, but cannot thereafter pass through valve 1234 because that valve is closed. Thus, refrigerant must flow through inside coil 1216.

Upon exiting inside coil 1216, refrigerant flows through metering device 1224 to reach thermal storage device 1218. There it absorbs energy from the phase change materials contained within device 1218. Because valve 1230 is closed and valve 1228 is open, refrigerant flowing in conduit 1238 can pass through valve 1228 to return to compressor 1212 by way of reversing valve 1226.

In a second of the bypass flow loops in the discharging cycle, valve 1234 is opened and valve 1228 is closed. Valves 1230 and 1232 remain closed. In addition, pump 1240 is turned on, and compressor 1212 is turned off.

Thus, refrigerant passes through inside coil 1216, releasing heat and liquefying, and then (flowing in a clockwise direction) passes through junction 1246 and through pump 1240. Once it passes pump 1240, refrigerant can pass through thermal storage device 1218, absorbing energy and evaporating.

Upon exiting thermal storage device 1218, refrigerant can pass through open valve 1234 to recirculate through inside coil 1216. Optionally, an auxiliary heater 1242 can be provided to operate in connection with the phase change materials contained within thermal storage device 1218 to provide additional energy to the incoming refrigerant stream.

To operate system 1210 in the discharging cycle with simultaneous flow in both the main flow loop and in one of the bypass flow loops, valves 1232 and 1234 are both opened, while valves 1228 and 1230 are both closed. Pump 1240 and compressor 1212 are turned on.

Accordingly, the primarily vapor refrigerant exiting compressor 1212 and passing through reversing valve 1226 is directed through conduit 1236 to junction 1248. At the same time, refrigerant is pumped by pump 1240 through thermal storage device 1218. The primarily vapor refrigerant stream exiting thermal storage device 1218 flows through open valve 1234, also reaching junction 1248. Thus, the two primarily vapor refrigerant streams join at junction 1248 and the combined flow passes through inside coil 1216, releasing heat there and condensing.

The now primarily liquid refrigerant stream exits inside coil 1216 and flows to junction 1246. At junction 1246, a portion of the refrigerant flows to pump 1240 and is subsequently pumped through thermal storage device 1218 as previously described. The remainder of the refrigerant flows through metering device 1222, open valve 1232, and outside coil 1214, returning to compressor 1212 by way of reversing valve 1226.

System 1210 can also be operated as an air conditioner. For operation in the charging cycle, valves 1230 and 1234 are open, and valves 1228 and 1232 are closed. Reversing valve 1226 is positioned to direct flow from compressor 1212 to conduit 1244.

Because valve 1228 is closed, refrigerant passes from conduit 1244 through outside coil 1214. Refrigerant then passes through open valve 1230, through metering device 1220, and into thermal storage device 1218, absorbing energy from the phase change materials within device 1218. Upon exiting thermal storage device 1218, refrigerant passes through open valve 1234 and can return to compressor 1212 by way of reversing valve 1226.

Operation of the air conditioner in a discharging cycle proceeds simultaneously in the main flow loop and in the bypass line as described with regards to the system illustrated in FIG. 11. To initiate flow in the bypass line, valve 1234 is opened; valves 1228, 1230, and 1232 are all closed; pump 1240 is turned on; and compressor 1212 is turned off.

Consequently, liquid refrigerant is pumped by pump 1240 through junction 1246 to inside coil 1216, and gaseous refrigerant passes from there through open valve 1234 to reach thermal storage device 1218, where the gaseous refrigerant is liquified. Upon exiting thermal storage device 1218, refrigerant is forced to return to pump 1240 because valves 1228 and 1230 are closed.

To initiate flow in the main flow loop in the discharging cycle, valve 1232 is also opened. Valve 1234 remains open, and valves 1228 and 1230 remain closed. In addition, compressor 1212 is turned on. Thus, refrigerant in conduit 1244 can flow through outside coil 1214, and through open valve 1232 and metering device 1222, eventually reaching junction 1246. There, the refrigerant joins refrigerant pumped by pump 1240 from thermal storage device 1218. The combined flow passes through inside coil 1216, releasing "coolness" to the space being conditioned. Upon exiting inside coil 1216, the flow can branch off, passing through open valve 1234 to return to thermal storage device 1218. The flow also passes into conduit 1236 and then returns to compressor 1212 by way of reversing valve 1226.

Figure 13:
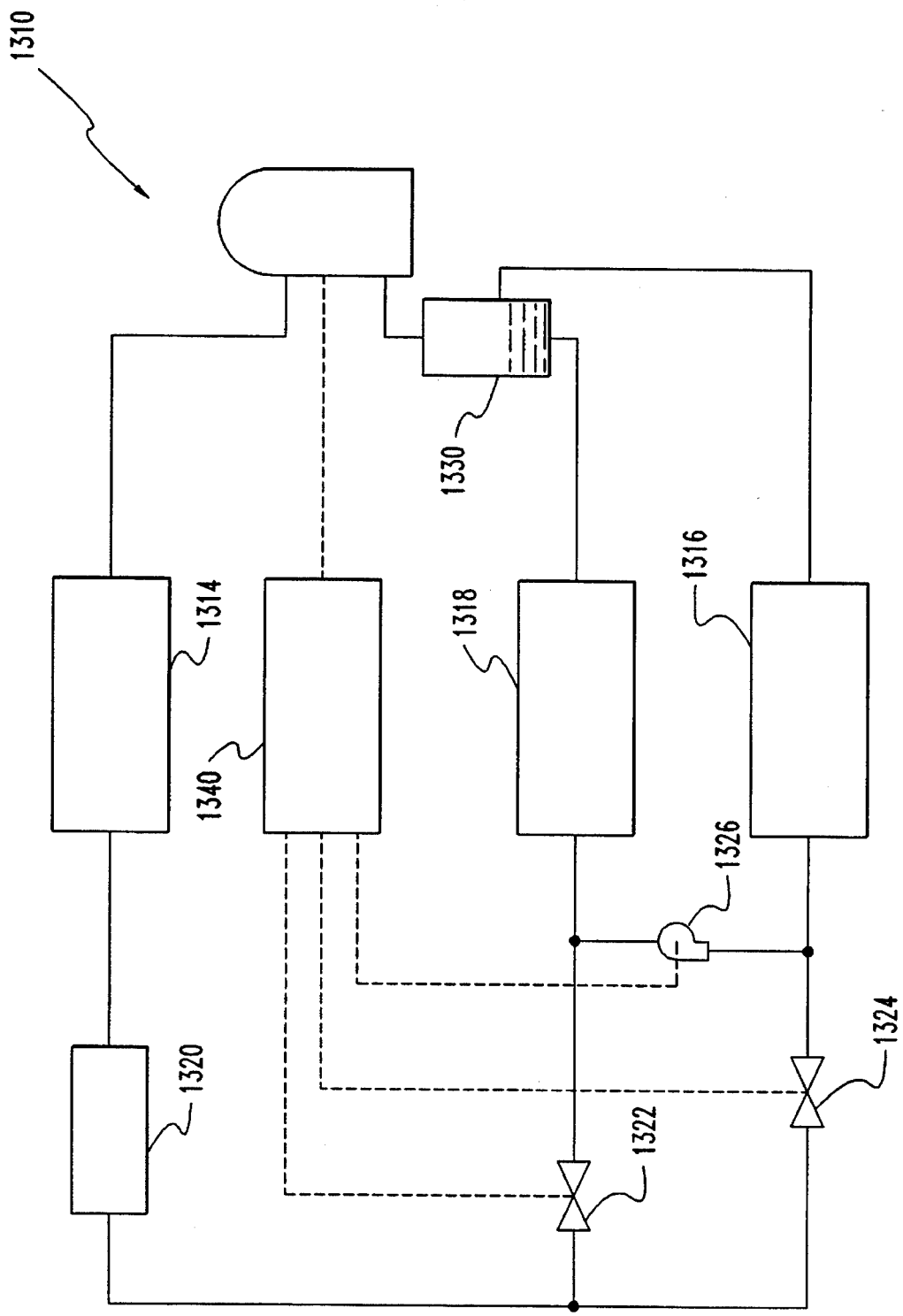
FIG. 13 is a diagrammatic view of yet another embodiment of an air conditioning or refrigeration system incorporating a thermal storage device and a refrigerant pump, the system being operable in a conventional cycle, charging cycles, and a discharging cycle in which refrigerant can flow in both a main flow loop and in a bypass line.

Another embodiment of the present invention is illustrated in FIG. 13. As shown, an air conditioning or refrigeration system 1310 includes a compressor 1312, outside and inside coils 1314, 1316 respectively, and a thermal storage device 1318. System 1310 further includes a single metering device 1320 and a pair of valves 1322, 1324 respectively. A refrigerant pump 1326 is provided. Optionally, a liquid refrigerant separator 1330 may be provided upstream of compressor 1312. A controller 1340 can also be provided.

System 1310 is operable as an air conditioner or a refrigeration system in conventional, charging, and discharging cycles. For operation in the conventional cycle, valve 1322 is closed and valve 1324 is open. In addition, compressor 1312 is operating, and pump 1326 is not operating. As noted with regards to previous embodiments, additional valving in line 1328 may be needed to block unwanted flow through pump 1326 if, for example, pump 1326 is a centrifugal pump.

Accordingly, in this configuration, refrigerant flows from compressor 1312, through outside coil 1314, and then through metering device 1320. Because valve 1322 is closed, refrigerant bypasses thermal storage device 1318 entirely, flowing instead through open valve 1324 to reach inside coil 1316. Once the refrigerant flows through inside coil 1316, it returns to compressor 1312, passing through liquid separator 1330 if such is provided.

For operation of system 1310 in the charging cycle, valve 1324 is opened and valve 1326 is closed. Compressor 1312 is in operation, while pump 1326 is turned off. Thus, refrigerant flows from compressor 1312 through outside coil 1314 and metering device 1320, and then flows through open valve 1322 to reach thermal storage device 1318. After absorbing heat from the phase change materials contained within thermal storage device 1318 (and thus "charging" thermal storage device with "coolness"), primarily gaseous refrigerant flows through optional separator 1330 and returns to compressor 1312.

For operation of system 1310 in the discharging cycle, refrigerant can flow either in the bypass line alone or simultaneously in the bypass line and in the main flow loop. To initiate flow in the bypass line, valves 1322 and 1324 are both closed. Compressor 1312 is turned off, and pump 1326 is turned on. Thus, pump 1326 pumps refrigerant through inside coil 1316, where the refrigerant picks up heat and discharges "coolness" to the space to be conditioned. The primarily gaseous refrigerant then passes through optional liquid separator 1330 and returns to thermal storage device 1318.

To initiate flow in the main flow loop in the discharging cycle while maintaining flow in the bypass line, compressor 1312 is turned on and valve 1324 is opened. Valve 1322 remains open and pump 1326 remains on. Thus, refrigerant flows from compressor 1312 through outside coil 1314, metering device 1320, valve 1324, and inside coil 1316 before returning to compressor 1312 (optionally passing through liquid separator 1330). At the same time, refrigerant circulates in the bypass line from pump 1326 to inside coil 1316 through liquid separator 1330 and to thermal storage device 1318 (thus flowing in the bypass line in a counterclockwise direction). As previously noted, this may allow the compressor capacity to be reduced significantly with no loss in performance.

Figure 14:
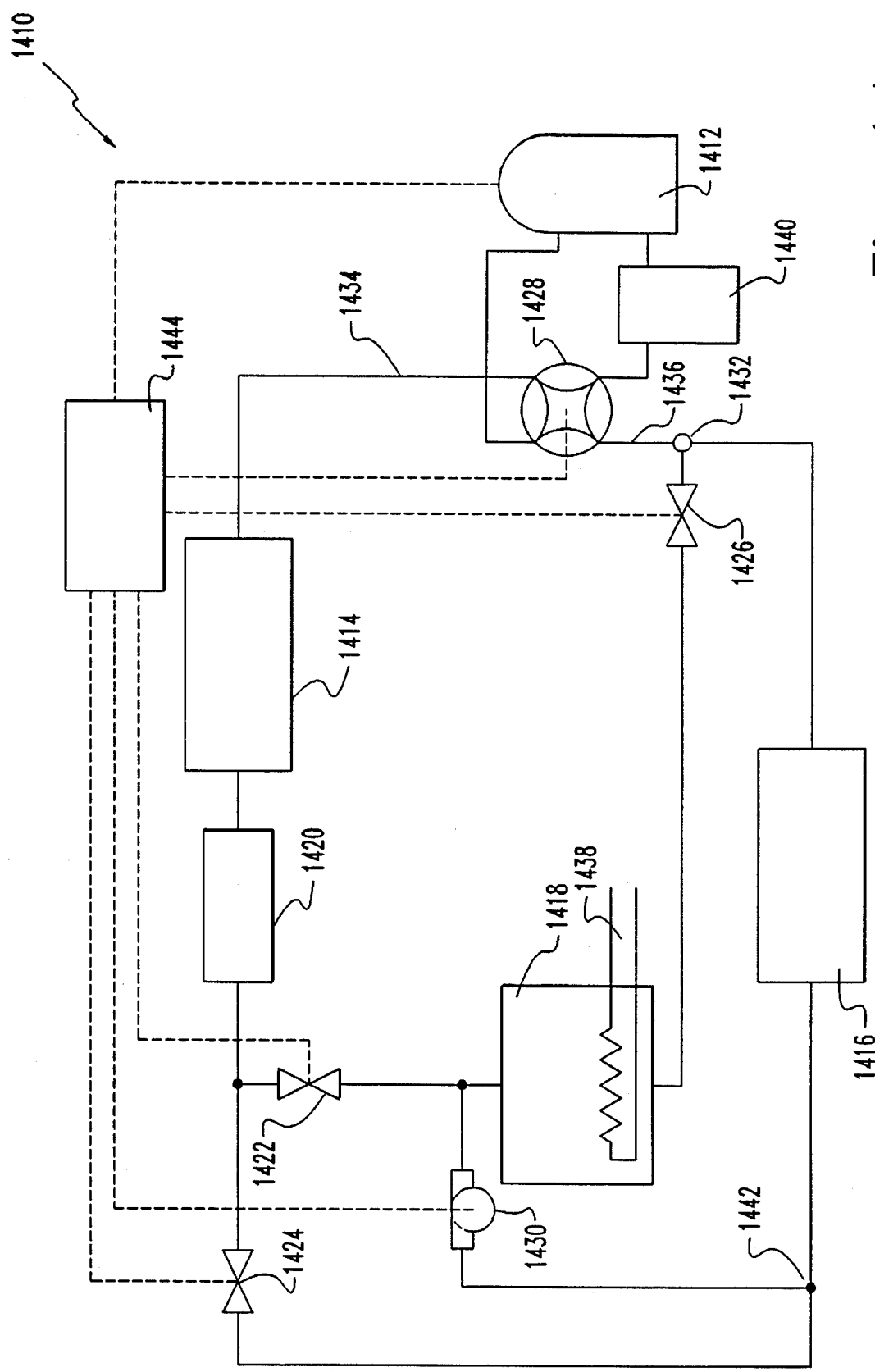
FIG. 14 is a diagrammatic view of yet another embodiment of a heating and cooling system incorporating a thermal storage device and a refrigerant pump, the system being operable in a conventional cycle, a charging cycle, and a discharging cycle in which refrigerant can flow in both a main flow loop and in a bypass line; and, FIG. 15 is a diagrammatic view of still another embodiment of a heating and cooling system incorporating a thermal storage device and a refrigerant pump, the system being operable in a conventional cycle, a charging cycle, and a discharging cycle in which refrigerant can flow in both a main flow loop and in a bypass line.

Yet another embodiment of the claimed invention is illustrated in FIG. 14. System 1410 shown in FIG. 14 may be operated as an air conditioning or refrigeration system, or may be operated as a heat pump. System 1410 includes a compressor 1412, outside coil 1414, inside coil 1416, and thermal storage device 1418. System 1410 further includes a metering device 1420, three valves 1422, 1424, and 1426, and a reversing valve 1428. It will be recognized from the description below that valve 1426 is optional. A refrigerant pump 1430 is also provided, and a controller 1444 is optionally provided.

For operation of system 1410 in a conventional cycle, valve 1424 is open, while valves 1422 and 1426 are closed. Compressor 1412 is turned on, while pump 1430 is turned off. Refrigerant thus flows from compressor 1412 through outside coil 1414, and through metering device 1420. Because valve 1422 is closed and valve 1424 is open, refrigerant flows through valve 1424 to reach inside coil 1416. Because valve 1426 is also closed, refrigerant exiting inside coil 1416 flows through line 1436 and through reversing valve 1428. It can then flow through optional liquid separator 1440 to reach compressor 1412.

For operation of system 1410 as a heat pump in a charging cycle, valves 1426 and 1422 are open, while valve 1424 is closed. Compressor 1412 is turned on, and pump 1430 is turned off. Thus, refrigerant flows from compressor 1412 through reversing valve 1428 to line 1436. Because valve 1426 is open and valve 1424 is closed, refrigerant flows through valve 1426 to reach thermal storage device 1418, releasing heat to the phase change materials contained within device 1418. Upon exiting thermal storage device 1418, refrigerant passes through open valve 1422 and passes through metering device 1420 to reach outside coil 1414. From there, refrigerant returns to compressor 1412 by way of reversing valve 1428, passing through optional liquid separator 1440.

For operation of system 1410 as a heat pump in the discharging cycle, valve 1426 is open, while valves 1424 and 1422 are closed. Compressor 1312 is turned off, while pump 1430 is turned on. Auxiliary heater 1438 may be turned on.

Thus, in this configuration, refrigerant is pumped by pump 1430 through thermal storage device 1418, open valve 1426, junction 1432, and inside coil 1416 (thus flowing in a clockwise direction in the bypass line). There, the refrigerant liquefies and flows through junction 1442 to pump 1430. Because valve 1422 is closed, the refrigerant continues to circulate in the bypass line, returning to thermal storage device 1418 to absorb heat from the phase change materials and from auxiliary heater 1438.

To initiate flow in the main flow loop in the discharging cycle while maintaining flow in the bypass line, valve 1422 is closed, but valves 1424 and 1426 are opened. Compressor 1412 and pump 1430 are both turned on. Thus, refrigerant flows from compressor 1412 through reversing valve 1428 and through line 1436 to junction 1432. There, the refrigerant joins the bypass flow (i.e. the flow reaching junction 1432 by way of thermal storage device 1418 and open valve 1426). The combined refrigerant flow passes through inside coil 1416, then flows to junction 1442. At junction 1442, a portion of the refrigerant returns to the bypass line, passing through pump 1430 and thermal storage device 1418 as previously described. The remainder of the refrigerant flows through junction 1442 in the main flow loop, passing through metering device 1420 and through outside coil 1414, ultimately returning to compressor 1412 by way of reversing valve 1428 and optional liquid separator 1440.

As previously noted, system 1410 can also operate as an air conditioner or refrigeration system. In the charging cycle, valves 1422 and 1426 are opened, while valve 1424 is closed. Compressor 1412 is on, and pump 1430 is off. Refrigerant flows from compressor 1412 through reversing valve 1428 to outside coil 1414. Refrigerant then passes through metering device 1420 and through open valve 1422 to thermal storage device 1418, absorbing heat from the phase change materials therein (i.e., charging the phase change materials with "coolness"). From there, refrigerant flows through open valve 1426 and returns to compressor 1412.

For operation of system 1410 as an air conditioner or refrigeration system in a discharging cycle, valve 1426 is opened, and valves 1422 and 1424 are closed to initiate flow in the bypass line. Compressor 1412 is off, and pump 1430 is on. Refrigerant is pumped by pump 1430 through inside coil 1416, through open valve 1426, and through thermal storage device 1418 (thus flowing in a counterclockwise direction). Because valve 1422 is closed, refrigerant must return to pump 1430 and continue to circulate in the bypass line.

To initiate flow in the main flow loop in the discharging cycle while maintaining flow in the bypass line, valves 1424 and 1426 are both opened, and valve 1422 is closed. Both pump 1430 and compressor 1412 are turned on. Thus, refrigerant flows from compressor 1412 through reversing valve, then through outside coil 1414, and through metering device 1420, subsequently passing through open valve 1424 and reaching junction 1442. At the same time, refrigerant is flowing in the bypass line as described above. Thus, the combined refrigerant flow at junction 1442 flows through inside coil 1416, evaporates, then passes to junction 1432. There, a portion of the refrigerant returns to the bypass line, passing through valve 1426 to reach thermal storage device 1418, where the refrigerant liquefies and then flows to pump 1430 as previously described. The remainder of the refrigerant continues flowing in the main flow loop, passing through junction 1432 and returning to compressor 1412 by way of reversing valve 1428.

Figure 15:
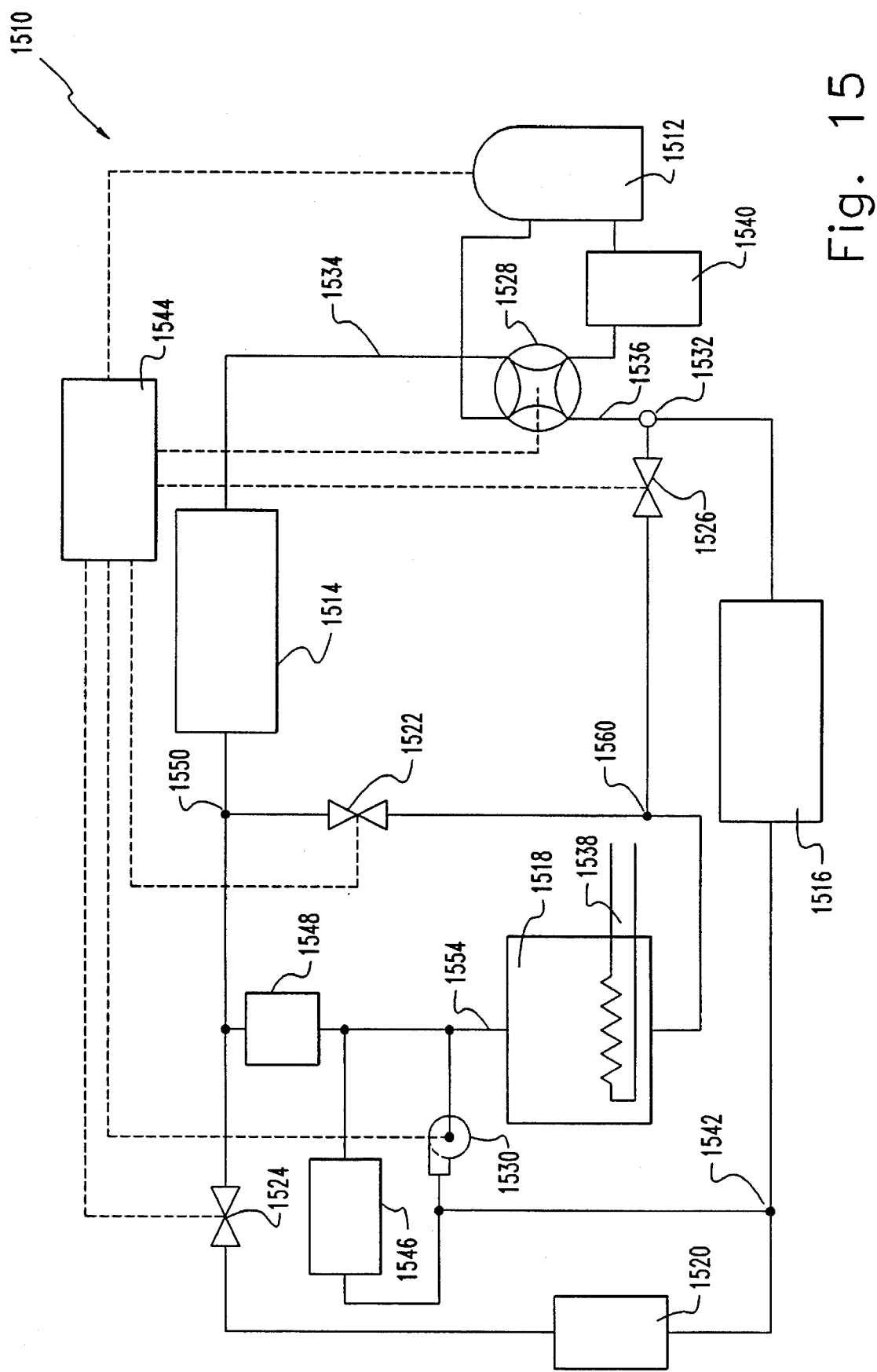

Another embodiment of the present invention is illustrated in FIG. 15. System 1510 includes a compressor 1512, outside coil 1514, inside coil 1516, and thermal storage device 1518. System 1510 further includes metering devices 1546, 1548, three valves 1522, 1524, and 1526, and a reversing valve 1528. A refrigerant pump 1530 is also provided. A controller 1544, a liquid separator 1540, and a heating coil 1538 extending through thermal storage device 1518 are all optional.

For operation of system 1510 in a conventional cycle, valve 1524 is open, while valves 1522 and 1526 are closed. Compressor 1524 is turned on, while pump 1530 is turned off. Refrigerant thus flows from compressor 1512 through outside coil 1514, through opened valve 1524, and through metering device 1520 to reach inside coil 1516. Refrigerant exiting inside coil 1516 flows through line 1536 and through reversing valve 1528. It can then flow through optional liquid separator 1540 to reach compressor 1512.

For operation of system 1510 as an air conditioner in the charging cycle, valve 1526 is opened, while valves 1522 and 1524 are closed. Compressor 1512 is on, and pump 1530 is off. Refrigerant flows from compressor 1512 through reversing valve 1528 to outside coil 1514. Refrigerant then passes through metering device 1548 and through thermal storage device 1518, absorbing heat from the phase change materials therein. From there, refrigerant flows through open valve 1526 and returns to compressor 1512.

For operation of system 1510 in the discharging cycle, valves 1524 and 1526 are closed while valve 1522 is opened. Gaseous refrigerant from compressor 1512 enters outside coil 1514 and liquifies, and the mainly liquid refrigerant flows through junction 1550 through opened valve 1522. Refrigerant subsequently passes through junction 1560 to reach thermal storage device 1518. The mainly liquid refrigerant becomes subcooled in thermal storage device 1518 and exits by way of line 1554.

Because pump 1530 is still turned off, the refrigerant flows through metering device 1546 and passes through junction 1542 to reach inside coil 1516, where it evaporates. Superheated vapor refrigerant exiting inside coil 1516 flows through junction 1532 and returns to compressor 1512 by way of reversing valve 1528.

After system 1510 is operated in this configuration for a predetermined period of time, liquid refrigerant fills the inlet line to pump 1530. Advantageously, only at this point is pump 1530 turned on, reducing the possibility that pump 1530 will be started when the inlet line is empty of refrigerant. At this point, valve 1522 is closed and valve 1526 is opened. System 1510 can then be operated in the discharging cycles in the same fashion as previously described for FIG. 14.

Although the invention has been described in detail with reference to certain preferred embodiments, variations and modifications exist within the scope and spirit of the invention as defined in the following claims.

We claim:

1. An apparatus for cooling a space, the apparatus comprising a main flow loop including a compressor, an outside heat exchanger, an inside heat exchanger connected to allow working fluid to circulate therebetween, and a first valve between the outside heat exchanger and the inside heat exchanger to block selectively flow between the outside heat exchanger and the inside heat exchanger, a first bypass line extending between the outlet of the outside heat exchanger and the inlet of the inside heat exchanger, a thermal storage device positioned in the first bypass line, a second bypass line extending between the inlet of the inside heat exchanger and the outlet of the inside heat exchanger and communicating with the first bypass line to bypass the inside heat exchanger, and a second valve positioned in the second bypass line to block selectively flow through the second bypass line.

2. The apparatus of claim 1, further comprising a first metering device positioned between the outside heat exchanger and the thermal storage device in the first bypass line.

3. The apparatus of claim 2, further comprising a third valve positioned in the main flow loop between the outside heat exchanger and the first valve to block selectively flow between the outside heat exchanger and the first valve, thereby forcing the working fluid to flow through the first metering device.

4. The apparatus of claim 1, further comprising a second metering device positioned between the thermal storage device and the inside heat exchanger in the bypass line.

5. The apparatus of claim 4, further comprising a fourth valve positioned in the main flow loop between the inside heat exchanger and the first valve to block selectively flow between the first valve and the inside heat exchanger, thereby forcing working fluid to flow through the second metering device.

6. The apparatus of claim 1, further comprising a liquid separator positioned between the inside heat exchanger and the compressor.

7. The apparatus of claim 1, further comprising a first and a second coil extending through the thermal storage device and a fifth valve to block selectively flow through one of the first or the second coils.

8. A method for charging a thermal storage device with thermal energy and for discharging the thermal storage device to cool a space, the system including an outside heat exchanger, a first metering device, a first bypass line for selectively bypassing the first metering device, a thermal storage device including a thermal storage medium, a second metering device, an inside heat exchanger, a second bypass line for selectively bypassing the second metering device and the inside heat exchanger, a compressor, and a refrigerant, the method comprising the steps of:

charging the thermal storage device by:
desuperheating and condensing refrigerant from a vapor to a liquid in the outside heat exchanger after the refrigerant is compressed;
flowing the liquid refrigerant through the first metering device;
evaporating the refrigerant in the thermal storage device and simultaneously extracting heat from the refrigerant to the thermal storage medium;
flowing refrigerant vapor through the second bypass line to the compressor;
and compressing the refrigerant vapor in the compressor;

and discharging the thermal storage device by:
desuperheating refrigerant vapor in the outside heat exchanger after the refrigerant is compressed;
flowing the refrigerant through the first bypass line;
extracting heat from the refrigerant in the thermal storage device to condense the refrigerant;
flowing liquid refrigerant through the second metering device;
evaporating the refrigerant in the inside heat exchanger;
and compressing the refrigerant vapor in the compressor.

9. The method of claim 8 further comprising switching between charging the thermal storage device by directing refrigerant flow through the first metering device and the second bypass line to charge the thermal storage device and discharging the thermal storage device by directing refrigerant flow through the first bypass line, the second metering device and the inside heat exchanger.

10. A method for charging a thermal storage device with thermal energy and for discharging the thermal storage device to cool a space, the system including an outside heat exchanger, a first metering device, a first bypass line for selectively bypassing the first metering device, a thermal storage device including a thermal storage medium, a second metering device, an inside heat exchanger, a second bypass line for selectively bypassing the second metering device and the inside heat exchanger, a compressor, and a refrigerant, the method comprising of the steps of:

charging the thermal storage device by:
desuperheating and condensing refrigerant from a vapor to a liquid in the outside heat exchanger after the refrigerant is compressed;
flowing the liquid refrigerant through the first metering device;
evaporating the refrigerant in the thermal storage device and simultaneously extracting heat from the thermal storage medium;
flowing refrigerant vapor through the second bypass line to the compressor;
and compressing the refrigerant vapor in the compressor;

and discharging the thermal storage device by:
desuperheating and condensing the refrigerant vapor in the outside heat exchanger after the refrigerant is compressed;
flowing the liquid refrigerant through the first bypass line;
subcooling the refrigerant in the thermal storage device by extracting heat from the refrigerant to the thermal storage medium;
expanding the liquid refrigerant through the second metering device;
evaporating the liquid refrigerant in the inside heat exchanger;
and compressing the refrigerant vapor in the compressor.

11. The method of claim 10 further comprising switching between charging the thermal storage device by directing refrigerant flow through first metering device and the second bypass line to charge the thermal storage device and discharging the thermal storage device by directing refrigerant flow through the first bypass line, the second metering device and the inside heat exchanger.

* * * * *